United States Patent
Kim

(10) Patent No.: US 11,032,619 B2
(45) Date of Patent: Jun. 8, 2021

(54) ELECTRONIC APPARATUS AND CONTROL METHOD THEREOF

(71) Applicant: SAMSUNG ELECTRONICS CO., LTD., Suwon-si (KR)

(72) Inventor: Mun-seok Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/840,661

(22) Filed: Dec. 13, 2017

(65) Prior Publication Data

US 2018/0206001 A1 Jul. 19, 2018

(30) Foreign Application Priority Data

Jan. 17, 2017 (KR) .................. 10-2017-0008030

(51) Int. Cl.
*H04N 21/24* (2011.01)
*H04N 21/262* (2011.01)
(Continued)

(52) U.S. Cl.
CPC ......... *H04N 21/4821* (2013.01); *H04N 21/40* (2013.01); *H04N 21/42204* (2013.01);
(Continued)

(58) Field of Classification Search
None
See application file for complete search history.

(56) References Cited

U.S. PATENT DOCUMENTS

2004/0075776 A1* 4/2004 Matsumoto ............ H04N 5/445
348/731
2004/0177261 A1 9/2004 Watt et al.
(Continued)

FOREIGN PATENT DOCUMENTS

CN 1536881 A 10/2004
CN 101909195 A 12/2010
(Continued)

OTHER PUBLICATIONS

Communication dated Apr. 23, 2018, issued by the European Patent Office in counterpart European Patent Application No. 18150374.9.
(Continued)

*Primary Examiner* — Brian T Pendleton
*Assistant Examiner* — Jean D Saint Cyr
(74) *Attorney, Agent, or Firm* — Sughrue Mion, PLLC

(57) ABSTRACT

An electronic apparatus and a method for managing a channel list is provided. The electronic apparatus may include: a receiver, a communicator, an input interface, and a controller. The receiver may be configured to receive a first broadcast signal. The communicator may be configured to receive a second broadcast signal through a network. The input interface may be configured to receive a user input. The controller may be configured to perform a channel scan for the first broadcast signal, generate a channel list including a first channel of the first broadcast signal, insert a second channel of the second broadcast signal in the channel list in response to determining that the second channel of the second broadcast signal exists based on information embedded in the first broadcast signal, and provide content corresponding to a channel selected from the channel list in response to the user input.

24 Claims, 18 Drawing Sheets

(51) Int. Cl.
*H04N 21/41* (2011.01)
*H04N 21/442* (2011.01)
*H04N 21/647* (2011.01)
*H04N 21/482* (2011.01)
*H04N 21/40* (2011.01)
*H04N 21/422* (2011.01)
*H04N 21/438* (2011.01)
*H04N 21/462* (2011.01)
*H04N 21/472* (2011.01)

(52) U.S. Cl.
CPC ..... *H04N 21/4383* (2013.01); *H04N 21/4622* (2013.01); *H04N 21/472* (2013.01); *H04N 21/482* (2013.01)

(56) References Cited

U.S. PATENT DOCUMENTS

| | | | |
|---|---|---|---|
| 2004/0205816 A1 | 10/2004 | Barrett | |
| 2007/0061842 A1* | 3/2007 | Walter | H04N 21/485 725/48 |
| 2008/0115167 A1* | 5/2008 | Hermsmeyer | H04L 67/2885 725/46 |
| 2009/0019484 A1* | 1/2009 | Jo | H04H 20/26 725/40 |
| 2011/0145869 A1* | 6/2011 | Rahman | H04L 65/80 725/87 |
| 2013/0194944 A1* | 8/2013 | Soyak | H04K 3/226 370/252 |
| 2013/0326558 A1 | 12/2013 | Kuo et al. | |
| 2014/0130100 A1* | 5/2014 | Wang | H04N 21/42224 725/52 |
| 2014/0137153 A1 | 5/2014 | Fay et al. | |
| 2015/0089246 A1 | 3/2015 | Kanai et al. | |
| 2017/0055040 A1* | 2/2017 | Volkman | H04N 21/4314 |
| 2017/0064215 A1* | 3/2017 | Cho | H04N 21/4532 |

FOREIGN PATENT DOCUMENTS

| | | |
|---|---|---|
| CN | 103475940 A | 12/2013 |
| CN | 104145434 A | 11/2014 |
| EP | 2242260 A1 | 10/2010 |
| KR | 1020150092873 A | 8/2015 |
| KR | 1020150096903 A | 8/2015 |
| WO | 2014028070 A1 | 2/2014 |
| WO | 2016/194373 A1 | 12/2016 |

OTHER PUBLICATIONS

Communication dated Jan. 2, 2019, issued by the European Patent Office in counterpart European Application No. 18150374.9.
Communication dated Oct. 10, 2019, issued by the European Patent Office in counterpart European Application No. 18150374.9.
Communication dated Feb. 27, 2020 issued by the Indian Patent Office in Indian Application No. 201814001287.
Communication dated Mar. 20, 2020 issued by the State Intellectual Property Office of the P.R. China in Chinese Application No. 201711368444.0.
Communication dated Aug. 8, 2020, issued by the European Patent Office in European Application No. 18150374.9.
Communication dated Aug. 3, 2020, issued by the European Patent Office in European Application No. 18150374.9.
Communication dated Apr. 12, 2021, issued by the European Patent Office in European Application No. 18150374.9.

\* cited by examiner

FIG. 4

| ELEMENT (ATTRIBUTES) | | | USE | DATA TYPE |
|---|---|---|---|---|
| SLT | | | | |
| | @bsid | | 1 | unsignedShort |
| | @sltcapabilities | | 0..1 | string |
| | ... | | ... | ... |
| | Service | | 1..N | |
| | | @service ID | 1 | unsignedShort |
| | | @majorchannelNo | 0..1 | 1..999 |
| | | ... | ... | ... |
| | | @broadbandAcessrequired | 0..1 | 1..999 |
| | | ... | ... | ... |

FIG. 10

| CHANNEL | TYPE | RECEPTION | 8:00 PM | 9:00 PM | ... |
|---|---|---|---|---|---|
| 1 | BROADCAST | ○ | SOAP OPERA | NEWS | |
| 2 | BROADCAST | ○ | RECREATION | SOAP OPERA | |
| 3 | BROADCAST | ○ | ENTERTAINMENT | COMEDY | |
| 4 | BROADCAST | ○ | SPORTS | SONG | |
| 4-1 | BROADBAND | × | GAME | GAME | |
| 5 | BROADCAST | ○ | DOCUMENTARY | SPORTS | |
| 6 | BROADCAST | ○ | NEWS | NEWS | |
| 6-1 | BROADBAND | × | MUSIC | MUSIC | |
| 6-2 | BROADBAND | × | RELIGION | RELIGION | |

FIG. 17

| CHANNEL NUMBER | CHANNEL NAME | STANDARDS | BROADCAST NETWORK |
|---|---|---|---|
| 9-1 | AAA HD | ATSC1.0 | BROADCAST |
| 9-1 | AAA UHD | ATSC3.0 | BROADCAST |
| 9-2 | AAA drama | ATSC3.0 | BROADBAND |
| 11-1 | BBB HD | ATSC1.0 | BROADCAST |
| 11-10 | BBB UHD | ATSC3.0 | BROADCAST |
| 11-11 | BBB sports | ATSC3.0 | BROADBAND |
| 11-12 | BBB every | ATSC3.0 | BROADBAND |
| ⋮ | ⋮ | ⋮ | ⋮ |

ELECTRONIC APPARATUS AND CONTROL METHOD THEREOF

CROSS-REFERENCE TO RELATED THE APPLICATION

The application claims priority from Korean Patent Application No. 10-2017-0008030, filed on Jan. 17, 2017 in the Korean Intellectual Property Office, the disclosure of which is incorporated herein in its entirety by reference.

BACKGROUND

1. Field

Apparatuses and methods consistent with exemplary embodiments relate to an electronic apparatus and a control method thereof, and more particularly, to an electronic apparatus which receives a broadcast signal and provides content of a selected channel and a control method thereof.

2. Description of the Related Art

A television (TV), a set-top box and other electronic apparatuses capable of receiving a broadcast signal receives a broadcast signal of a certain channel selected by a user among broadcast signals received from a broadcasting stations and others capable of transmitting a terrestrial signal, etc. and providing content.

Besides such a broadcast-signal channel, the electronic apparatus may use a network such as the Internet to receive a signal of content. That is, the electronic apparatus may use both the broadcast-signal channel and the network to receive and provide the content.

A discussion on embedding information about a network channel in a broadcast signal has recently begun, but there have been no techniques so far about how to use the broadcast signal in the electronic apparatus for providing service of the network channel.

In addition, there have been no solutions for processing the information about the network channel in the electronic apparatus if the electronic apparatus is not connected with the network even if the electronic apparatus might be able to receive the information through the broadcast signal.

SUMMARY

One or more exemplary embodiments provide an electronic apparatus that enhances a user's convenience by including a network channel in a channel list in accordance with various situations of the electronic apparatus, and a control method thereof.

In accordance with an aspect of an example embodiment, there is provided an electronic apparatus that includes: a receiver configured to receive a first broadcast signal; a communicator configured to receive a second broadcast signal through a network; an input interface configured to receive a user input; and a controller configured to perform a channel scan for the first broadcast signal, generate a channel list including a first channel of the first broadcast signal, insert a second channel of the second broadcast signal on the channel list in response to determining that the second channel of the second broadcast signal exists based on information embedded in the first broadcast signal, and receive and provide content corresponding to a channel selected from the channel list in response to the user input. Thus, it is possible to put a network channel on a channel list in accordance with various states of the electronic apparatus, and it is therefore more convenient for a user.

The controller may insert the second channel of the second broadcast signal on the channel list in response to determining that the second channel of the second broadcast signal exists and the communicator is connected to the network.

The controller may insert the second channel of the second broadcast signal on the channel list in response to determining that the second channel of the second broadcast signal exists and the second broadcast signal of the second channel is available to be received through the communicator.

The controller may store a potential list, in which the channel of the second broadcast signal is selectable by a direct input of the second channel, in response to at least one of the communicator being disconnected from the network and the second broadcast signal of the second channel being unavailable.

The controller may provide guide information for receiving the second channel of the second broadcast signal. Thus, it is more convenient for a user since the guide information is given for receiving content of an unavailable channel.

The controller may provide the guide information in response to the second channel of the second broadcast signal being selected by the user input while the communicator is disconnected from the network. Thus, a user checks presence of a network channel even though the network channel is not available, and it is more convenient for a user to use the channels.

The controller may provide electronic program guide (EPG) information including guide information about reception of the second channel for the second broadcast signal, thereby improving a user's convenience.

The controller may provide guide information for use of an application about the second channel of the second broadcast signal. Thus, it is more convenient for a user since the guide information about not only the network channel but also the application for using the network is provided.

In accordance with an aspect of an example embodiment, a method of controlling an electronic apparatus may include: performing a channel scan for a first broadcast signal; generating a channel list including a first channel of the first broadcast signal; inserting a second channel of a second broadcast signal on the channel list in response to determining that the second channel of the second broadcast signal exist based on information embedded in the first broadcast signal; and receiving and providing content corresponding to a channel selected from the channel list in response to a user input.

The inserting the second channel of the second broadcast signal on the channel list may further include: determining whether the electronic apparatus is connected to a network; and inserting the second channel of the second broadcast signal on the channel list in response to the electronic apparatus being connected to the network.

The inserting the second channel of the second broadcast signal on the channel list may include: determining whether the second broadcast signal of the second channel is available to be received through a network; and inserting the second channel of the second broadcast signal on the channel list in response to the second broadcast signal of the channel being unavailable to be received through the network.

The inserting the second channel of the second broadcast signal on the channel list may include: storing a potential list, in which the second channel of the second broadcast signal is selectable by a direct input of the second channel, in response to at least one of the electronic apparatus being disconnected from a network and the second broadcast signal of the second channel being unavailable.

The method may further include providing guide information for receiving the second channel of the second broadcast signal.

The providing the guide information may include: determining whether the electronic apparatus is connected to a network; and providing the guide information in response to the second channel of the second broadcast signal being selected by the user input while the electronic apparatus is disconnected from the network.

The method may further include: providing electronic program guide (EPG) information that includes guide information about reception of the second channel for the second broadcast signal.

The method may further include: providing guide information for use of an application about the second channel of the second broadcast signal.

BRIEF DESCRIPTION OF THE DRAWINGS

The above and/or the aspects will become apparent and more readily appreciated from the following description of exemplary embodiments, taken in conjunction with the accompanying drawings, in which:

FIG. 4 illustrates an example of service information according to an exemplary embodiment;

FIG. 10 illustrates an electronic program guide (EPG) generated based on the channel list according to an exemplary embodiment;

FIG. 17 is a table of showing information about channels receivable in the electronic apparatus according to another exemplary embodiment.

DETAILED DESCRIPTION OF EXEMPLARY EMBODIMENTS

Reference will now be made in detail to exemplary embodiments, with reference to the accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the inventive concept. The word "exemplary" is used herein to mean "serving as an example or illustration." Any aspect or design described herein as "exemplary" is not necessarily to be construed as preferred or advantageous over other aspects or designs. The expression, "at least one of a, b, and c," should be understood as including only a, only b, only c, both a and b, both a and c, both b and c, or all of a, b, and c.

Figure 1:
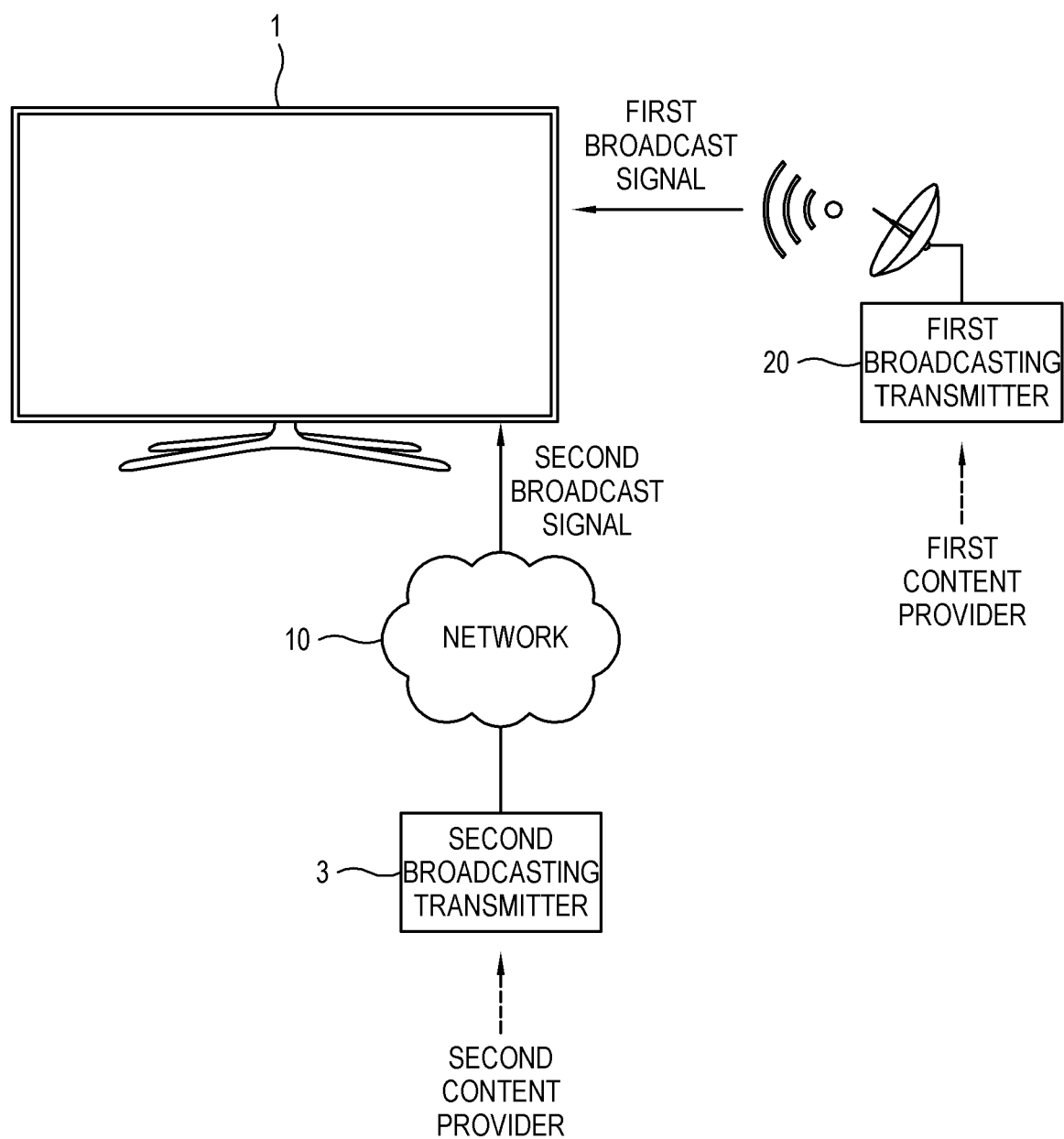
FIG. 1 illustrates an electronic apparatus according to an exemplary embodiment.

FIG. 1 illustrates an electronic apparatus according to an exemplary embodiment. The electronic apparatus 1 according to an exemplary embodiment may be a TV. Alternatively, the electronic apparatus 1 may be a smart phone, a tablet computer, a mobile phone, a personal computer, a multimedia player, an electronic photo frame, a digital signboard, a large format display (LFD), a digital signage, a set-top box, a smart watch, a head-mounted display or similar wearable device, a refrigerator, or other apparatus capable of receiving a network signal and providing content, but not limited thereto.

The electronic apparatus 1 in this exemplary embodiment may receive a first broadcast signal from a first broadcasting transmitter 20. The first broadcast signal may be a terrestrial broadcast signal. The electronic apparatus 1 may receive a second broadcast signal from a second broadcasting transmitter 3 through a network 10. The second broadcasting transmitter 3 may be a network server. As an example of the network 10 between the electronic apparatus 1 and the second broadcasting transmitter 3, the Internet may be used. However, there are no limits to what type of a network that the network 10 can be. Each of the first broadcast signal and the second broadcast signal (hereinafter, referred to as a "broadcast signal") includes content provided by a content provider (e.g., a first content provider or a second content provider) corresponding to at least one channel. The content may include a TV program provided in real time (i.e., live), a video on demand (VOD) provided according to a user's demand, etc., but not limited thereto. Further, each broadcast signal may include a variety of pieces of information besides the content. For example, the information may include information used in extracting content of a corresponding channel from a received broadcast signal, program guide information (e.g., electronic program guide) for guiding the use of content, etc.

Referring to FIG. 1, there may be one or at least two content providers. Further, each content provider need not be a specific content provider, and the first content provider and the second content provider may be the same or different from each other. For example, the term "broadcasting station A" may be used as the first content provider to provide content through the first broadcast signal of a "channel A," and at the same time used as the second content provider to provide content through the second broadcast signal of a "channel B." If a certain content provider (e.g., the "broadcasting station A") uses both the first broadcast signal and the second broadcast signal to provide the content, two pieces of content respectively embedded in the first broadcast signal and the second broadcast signal may be the same or related to each other. For example, the "broadcasting station A" may provide the same "program A" through the first broadcast signal of the "channel A" and the second broadcast signal of the "channel B." In this case, a user selects one of the first broadcast signal of the "channel A" and the second broadcast signal of the "channel B," and uses the "program A" provided through the selected one. On the other hand, the "broadcasting station A" may provide the "program A" through the first broadcast signal of the "channel A," and provide a "program B" through the second broadcast signal of the "channel B." The "program B" may be a program related to the "program A." In this case, a user uses the "program B" given through the second broadcast signal of the "channel B" while using the "program A" given through the first broadcast signal of the "channel A." Further, the "broadcasting station A" may provide the "program A" through the first broadcast signal of the "channel A," and provide appended information of the "program A" through the second broadcast signal of the "channel B."

Figure 2:
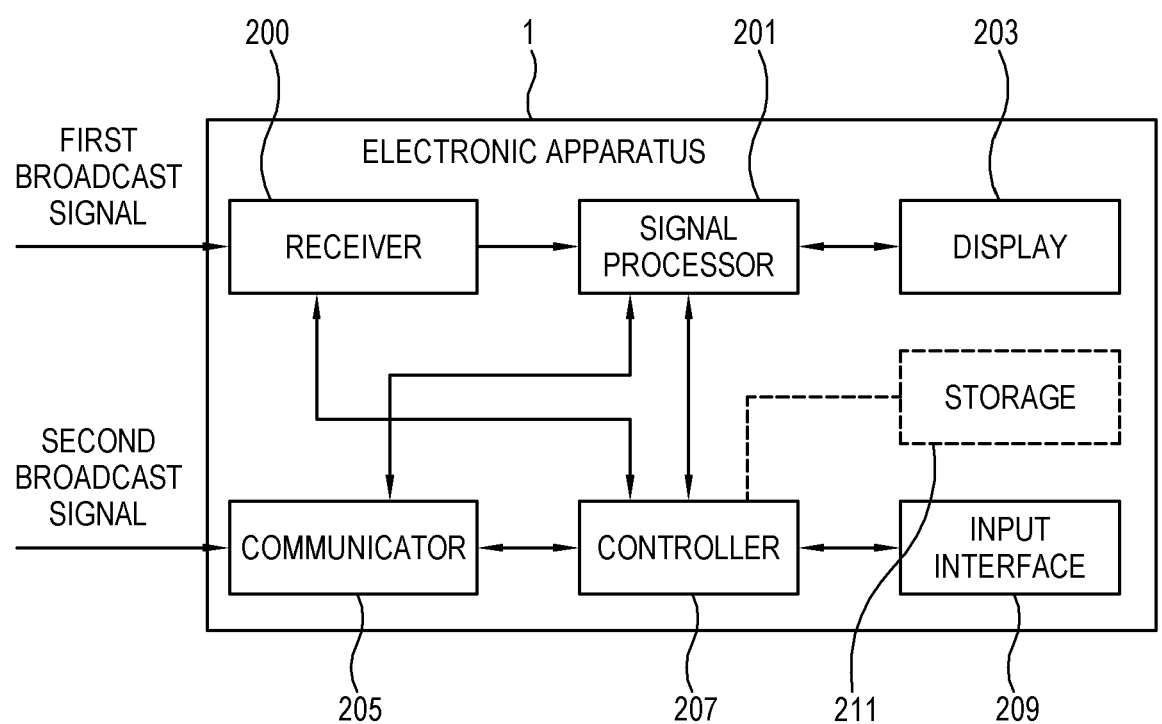
FIG. 2 is a block diagram of the electronic apparatus according to an exemplary embodiment.

FIG. 2 is a block diagram of the electronic apparatus according to an exemplary embodiment. The electronic apparatus 1 in this exemplary embodiment includes a receiver 200, a communicator 205, an input interface 209 and a controller 207. The electronic apparatus 1 according to an exemplary embodiment may further include at least one of a signal processor 201, a display 203 and a storage 211. The structure of the electronic apparatus 1 shown in FIG. 2 is just given by way of example, and the electronic apparatus 1 according to an exemplary embodiment may include another element in addition to the elements shown in FIG. 2 or exclude a certain element from the elements shown in FIG. 2.

The receiver 200 may receive a first broadcast signal. The receiver 200 may receive the first broadcast signal from the broadcasting transmitter 20. The receiver 200 may include a tuner for receiving the first broadcast signal. The tuner may be tuned to a channel selected by a user among channels corresponding to a plurality of first broadcast signals. Under control of the controller 207, the receiver 200 may receive the first broadcast signal of the channel selected by a user. In this exemplary embodiment, the first broadcast signal may be a digital TV signal that complies with Advanced Television Systems Committee (ATSC) 3.0 standards. However, there are no limits to the standards of the first broadcast signal according to an exemplary embodiment. Alternatively, the receiver 200 may receive the first broadcast signal from a broadcasting receiver for receiving the first broadcast signal. For example, the broadcasting receiver may be provided at the outside of the electronic apparatus 1 and connected to the electronic apparatus 1. The broadcasting receiver may receive the first broadcast signal and transmit the received first broadcast signal to the receiver 200. In this case, the broadcasting receiver may be a Universal Serial Bus (USB) dongle, and the receiver 200 may be a USB connector to which the broadcasting receiver is connected.

The communicator 205 may connect with the network 10 and receive a second broadcast signal from the second broadcasting transmitter 3. Under control of the controller 207, the receiver 200 may receive the second broadcast signal of a channel selected by a user. The communicator 205 may include at least one connector or terminal corresponding to a variety of standards. To connect with the network 10, the communicator 205 may perform wired network communication for a local area network (LAN) or other network environments. Alternatively, the communicator 205 may perform wireless network communication for Wi-Fi, ultra-wide band (UWB), etc. to connect with the network 10. The communicator 205 may include a radio frequency (RF) circuit for transmitting and receiving an RF signal for the wireless communication with an external device, and perform at least one of near field communication (NFC) and a wireless USB. The second broadcast signal may be a broadband signal that complies with ATSC 3.0 standards. However, there are no limits to the standards of the second broadcast signal according to an exemplary embodiment.

The input interface 209 receives a user's input and transmits it to the controller 207. The input interface 209 may be variously embodied according to user's input methods. For example, the input interface 209 may be embodied by a menu button provided on an outer side of the electronic apparatus 1, a remote control signal receiver for receiving a remote control signal corresponding to a user's input received from a remote controller, a touch screen provided on the display 203 and sensing a user's touch input, a camera for sensing a user's gesture input, a microphone for sensing a user's voice input, a sensor for sensing a user's motion or position, etc. The user's input may include a channel selection command for selecting one of channels (see 301 and 303 in FIG. 5) corresponding to the first and second broadcast signals. For example, the channel selection command may include a sequential channel switching command for switching between channels 301 and 303 included in a channel list (see 300 in FIG. 5) in response to an input of an up/down arrow key or the like in the remote controller, and a direct channel switching command for moving to a channel 301 or 303 in response to an input of a channel name, a channel number or the like.

The storage 211 may be configured to store a variety of data in the electronic apparatus 1. The storage 211 may be a non-volatile memory (i.e., computer-readable storage medium) such as a flash memory, an erasable programmable read-only memory (EPROM) or an electrically erasable programmable read-only memory (EEPROM), a hard disk drive, etc. The storage 211 may store the channel list 300 therein.

The signal processor 201 may apply a signal process to broadcast signals received in the receiver 200 and/or the communicator 205 under control of the controller 207, and output the processed signal to the display 203 so that the display 203 can display an image. The signal processing implemented in the signal processor 201 may, for example, include demultiplexing for extracting a content signal, service information, etc. from a broadcast signal and dividing the extracted content signal into sub streams of video, audio and appended data; de-interlacing for converting an interlaced-type video signal into a progressive-type video signal;

scaling for adjusting a resolution of a video signal; noise reduction for improving quality of an image; detail enhancement; frame refresh rate conversion; etc. The signal processor 201 may be at least one processor for executing at least one program to implement the signal processing.

The display 203 may display an image of content based on the signal processed by the signal processor 201. There are no limits to the type of display 203, and the display 203 may be, for example, implemented by various display types such as liquid crystal, plasma, a light-emitting diode, an organic light-emitting diode, a surface-conduction electron-emitter, a carbon nano-tube (CNT), nano-crystal, etc. If the display 203 is the type of liquid crystal, it may include a liquid crystal display panel, a backlight unit for emitting light to the liquid crystal display panel, a panel driving substrate for driving the liquid crystal display panel, etc. The display 203 may be a self-emissive organic light emitting diode (OLED) panel without the backlight unit.

The controller 207 may control general operations of elements of the electronic apparatus 1. The controller 207 may include a control program for implementing such control, a nonvolatile memory in which the control program is installed, a volatile memory to which the installed control program is at least partially loaded, and at least one microprocessor (hereinafter, referred to as a "processor") or central processing unit (CPU) for executing the loaded control program. The control program may include program(s) embodied in the form of at least one among a basic input/output system (BIOS), a device driver, an operating system (OS), a firmware, a platform, and an application program. According to an exemplary embodiment, the application program may be previously installed or stored in the electronic apparatus 1 when the electronic apparatus 1 is manufactured, or installed later in the electronic apparatus 1 based on data of an application program received from the outside when it is needed. The data of the application program may be for example downloaded from an application market or other external server to the electronic apparatus 1. The signal processor 201 and the controller 207 may be respectively embodied by individual processors, or may be integrally embodied by a single processor. Alternatively, a processor corresponding to the controller 207 may implement at least some functions of the signal processor 201, and vice versa. Similarly, other elements represented in FIG. 2 may be integrated into a single component or module, or implemented as multiple components and modules.

The controller 207 may generate a channel list of channels corresponding to the available broadcast signals, in order to make it convenient for a user to select channels, efficiently receive the broadcast signal, etc. To generate the channel list, the controller 207 may control the receiver 200 and/or the communicator 205 to do a channel scan with regard to available broadcast signals. Under control of the controller 207, the receiver 200 and/or the communicator 205 may perform the channel scan by sequentially checking whether a broadcast signal is received or not at intervals of frequency (hereinafter, referred to as a "frequency band") assigned to each channel within a predetermined frequency band. If conditions for performing the channel scan are satisfied, e.g., when a user's input is received through the input interface 209 or when the electronic apparatus 1 is installed and/or operated for the first time, the controller 207 may control the channel scan to be implemented.

The controller 207 may generate the channel list based on information obtained by the channel scan from the receiver 200 and/or the communicator 205. Regarding each channel of the available broadcast signals, the channel list may include information about which one of the first broadcast signal and the second broadcast signal corresponds to the channel, information about a channel name, information about a channel number, information about a frequency band of the channel, etc. The pieces of information about the channel list may be given in sequence with regard to a plurality of channels. The controller 207 may control the storage 211 to store information about the generated channel list.

The controller 207 may control the receiver 200 and/or the communicator 205 to receive a broadcast signal of a selected channel based on the channel list stored in the storage 211 if a channel selection command is issued through the input interface 209. If the channel selection command is the direct channel switching command (e.g., a command to switch directly to a selected channel), the controller 207 may refer to the channel list stored in the storage 211, and control the receiver 200 and/or the communicator 205 to receive a broadcast signal of a channel corresponding to a directly input channel name, number or the like. Alternatively, if the channel selection command is the sequential channel switching command (e.g., a command to switch to a previous or next channel), the controller 207 may control the receiver 200 and/or the communicator 205 to receive a broadcast signal of a channel, which is switched over one after another in a predetermined order from the current channel, among the plurality of channels sequentially given in the channel list stored in the storage 211.

The controller 207 may control each of the receiver 200 and the communicator 205 to perform the channel scan with regard to each of the first broadcast signal and the second broadcast signal. The channel scan for the first broadcast signal in the receiver 200 and the channel scan for the second broadcast signal in the communicator 205 may be performed at the same time or at different times.

While the channel scan is performed with regard to one broadcast signal between the first broadcast signal and the second broadcast signal, the controller 207 according to an exemplary embodiment may determine whether there is a channel of the other broadcast signal based on the broadcast signal subjected to the channel scan. For example, the controller 207 may determine whether there is a channel of the second broadcast signal based on the first broadcast signal while the channel scan for the first broadcast signal is performed in the receiver 200. In this case, the controller 207 may use information embedded in the first broadcast signal (hereinafter, referred to as "service information") to identify a channel of the second broadcast signal. Besides information about whether there is a channel of the second broadcast signal, the service information may further include information about service (or broadcasting station) identification (ID), a channel number, a service category, etc.

Figure 3:
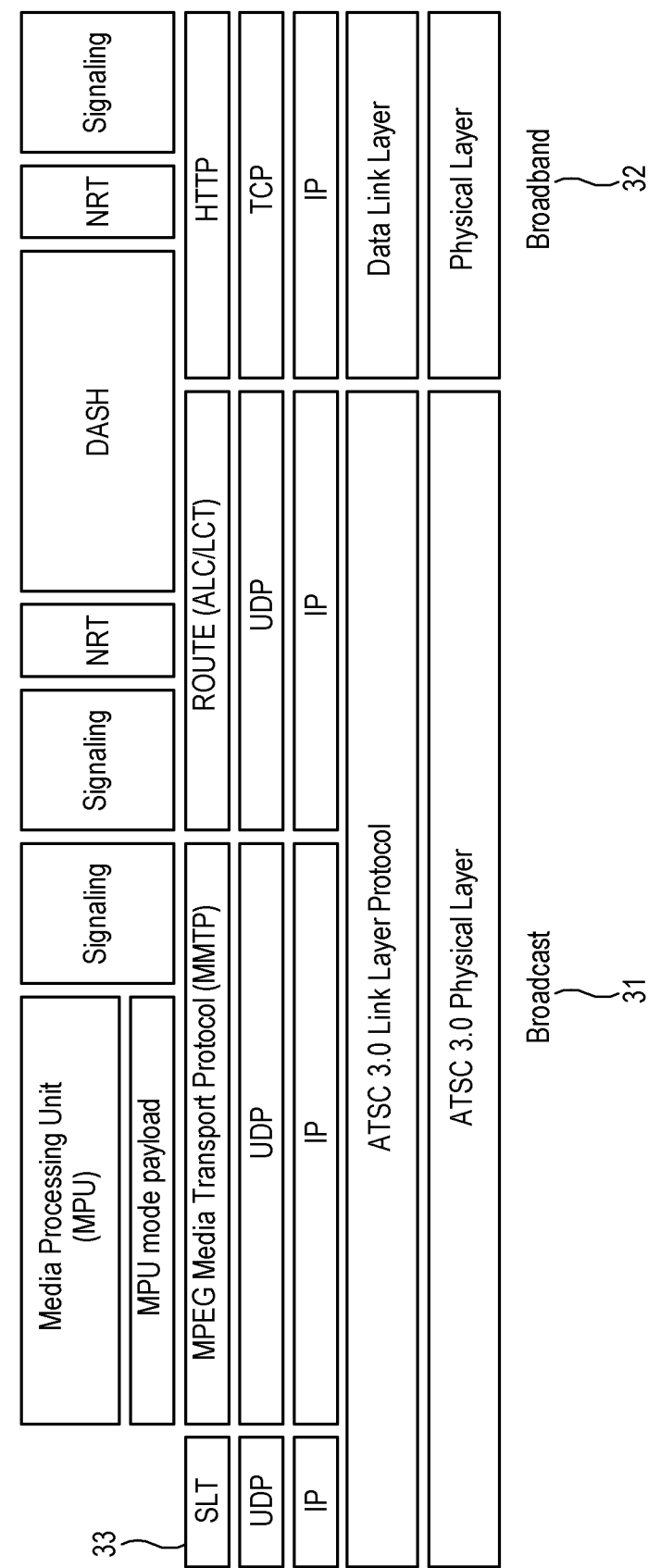
FIG. 3 is a block diagram of a structure of a broadcast signal according to an exemplary embodiment.

FIG. 3 is a block diagram of a structure of a broadcast signal according to an exemplary embodiment. According to an exemplary embodiment, the broadcast signal may, for example, comply with the ATSC 3.0 standards. In this exemplary embodiment, the first broadcast signal and the second broadcast signal may respectively correspond to a broadcast signal 31 and a broadband signal 32 as shown in FIG. 3. According to an exemplary embodiment, the service information may be included in a service list table ("SLT") 33 shown in FIG. 3. The signal processor 201 may extract the SLT 33 from the first broadcast signal received corresponding to each frequency band when the channel scan for the first broadcast signal is performed in the receiver 200. The signal processor 201 may extract the SLT 33, which is encapsulated through User Datagram Protocol (UDP) and Internet Protocol (IP) layers, from the first broadcast signal.

The controller 207 may determine whether there is a channel of the second broadcast signal based on the SLT 33 extracted from the first broadcast signal. FIG. 4 illustrates the SLT as an example of the service information according to an exemplary embodiment. The SLT 33 may include information about Service 41 that shows services provided through a broadcast signal of a corresponding frequency band. There may be two or more entries in the Service information 41. For example, there may be N entries of Service information 41 as shown in FIG. 4. The controller 207 may repetitively refer to (e.g., look up) the first to N-th entries in the Service information 41 on a loop. Among the N entries of Service information 41, at least one entry of Service information 41 may show information about a channel of the first broadcast signal of a corresponding frequency band. Among the other entries of Service information 41, at least one entry of Service information 41 may show information about a channel of the second broadcast signal. For example, the SLT 33 of the first broadcast signal of the frequency band corresponding to the broadcasting station A may include a first Service information 41 entry corresponding to channel A of the broadcasting station A provided through the first broadcast signal, and a second Service information 41 entry corresponding to channel A-1 of the broadcasting station A provided through the second broadcast signal. However, the content provider or the provided channel service is not limited to the foregoing exemplary embodiments.

Each entry of Service information 41 may include a field, such as @broadbandAccessRequired information 42, that indicates whether there exists a corresponding channel of the second broadcast signal. The controller 207 may determine whether the corresponding Service information 41 entry includes information about the channel of the second broadcast signal, based on a code value of the @broadbandAccessRequired information 42. If the corresponding Service information 41 entry shows the information about the channel of the second broadcast signal, the controller 207 may refer to other entries in the corresponding Service information 41, for example, @serviceId field, @majorChannelNo field, etc. to thereby check information about the channel of the second broadcast signal such as the service (or broadcasting station) ID, the channel number, etc. The controller 207 may put the channel of the corresponding second broadcast signal on the channel list based on the identified information about the channel of the second broadcast signal. If it is determined that the corresponding Service information 41 entry contains information about the channel of the first broadcast signal, the controller 207 may insert the channel of the corresponding first broadcast signal on the channel list, based on the @serviceId field, the @majorChannelNo field, etc. in the corresponding entry in the Service information 41. Accordingly, the controller 207 may generate a channel list that includes not only the channels of the first broadcast signal but also the channels of the second broadcast signal, based on the first broadcast signal during the channel scan for the first broadcast signal.

Figure 5:
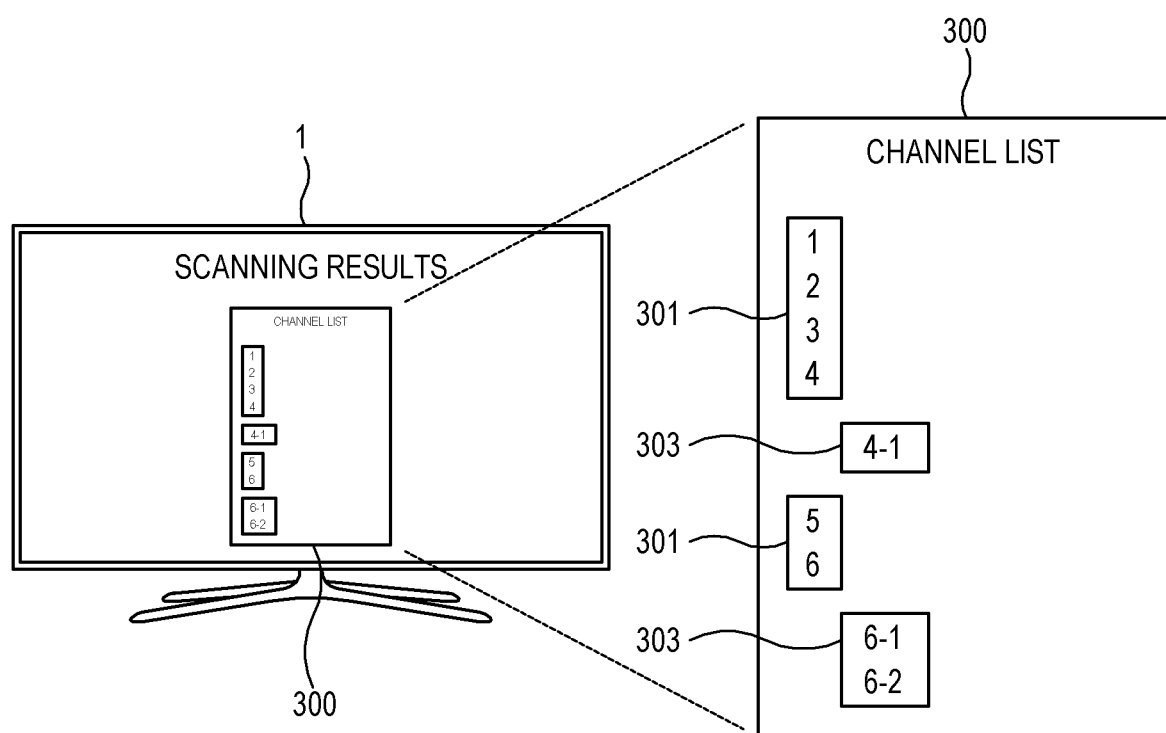
FIG. 5 illustrates a channel list collected by a channel scan in the electronic apparatus according to an exemplary embodiment.

FIG. 5 illustrates a channel list according to an exemplary embodiment. As shown in FIG. 5, the controller 207 may generate a channel list 300 based on information about the channel 301 of the first broadcast signal and the channel 303 of the second broadcast signal obtained by the channel scan for the first broadcast signal. The channel 301 of the first broadcast signal may, for example, include channel 1, channel 2, . . . , channel 4, etc., and the channel 303 of the second broadcast signal may, for example, include channel 4-1, channel 6-1, etc. The controller 207 may control the display 203 to display the channel list 300. However, the channels 301 and 303 included in the channel list 300 shown in FIG. 5 are just given as an example and not construed as limiting the present disclosure.

If it is determined as a result of the channel scan for the first broadcast signal that there is a channel of the second broadcast signal, the controller 207 may insert the channel of the second broadcast signal on the channel list in accordance with status or condition of the electronic apparatus 1. According to an exemplary embodiment, the conditions of the electronic apparatus 1 may include a network connection status of the electronic apparatus 1, a reception status of the second broadcast signal in the electronic apparatus 1, etc. but not limited thereto. For example, if it is determined as a result of the channel scan for the first broadcast signal that there is a channel of the second broadcast signal, the controller 207 may insert the channel of the second broadcast signal on the channel list in accordance with network connection status. That is, if it is determined based on the first broadcast signal that there is a channel of the second broadcast signal, the controller 207 may determine whether the communicator 205 is connected to the network 10. If the communicator 205 is connected to the network 10, the controller 207 may insert the channel of the second broadcast signal on the channel list. On the other hand, if the communicator 205 is not connected to the network 10, the controller 207 may not insert the channel of the second broadcast signal on the channel list.

Figure 6:
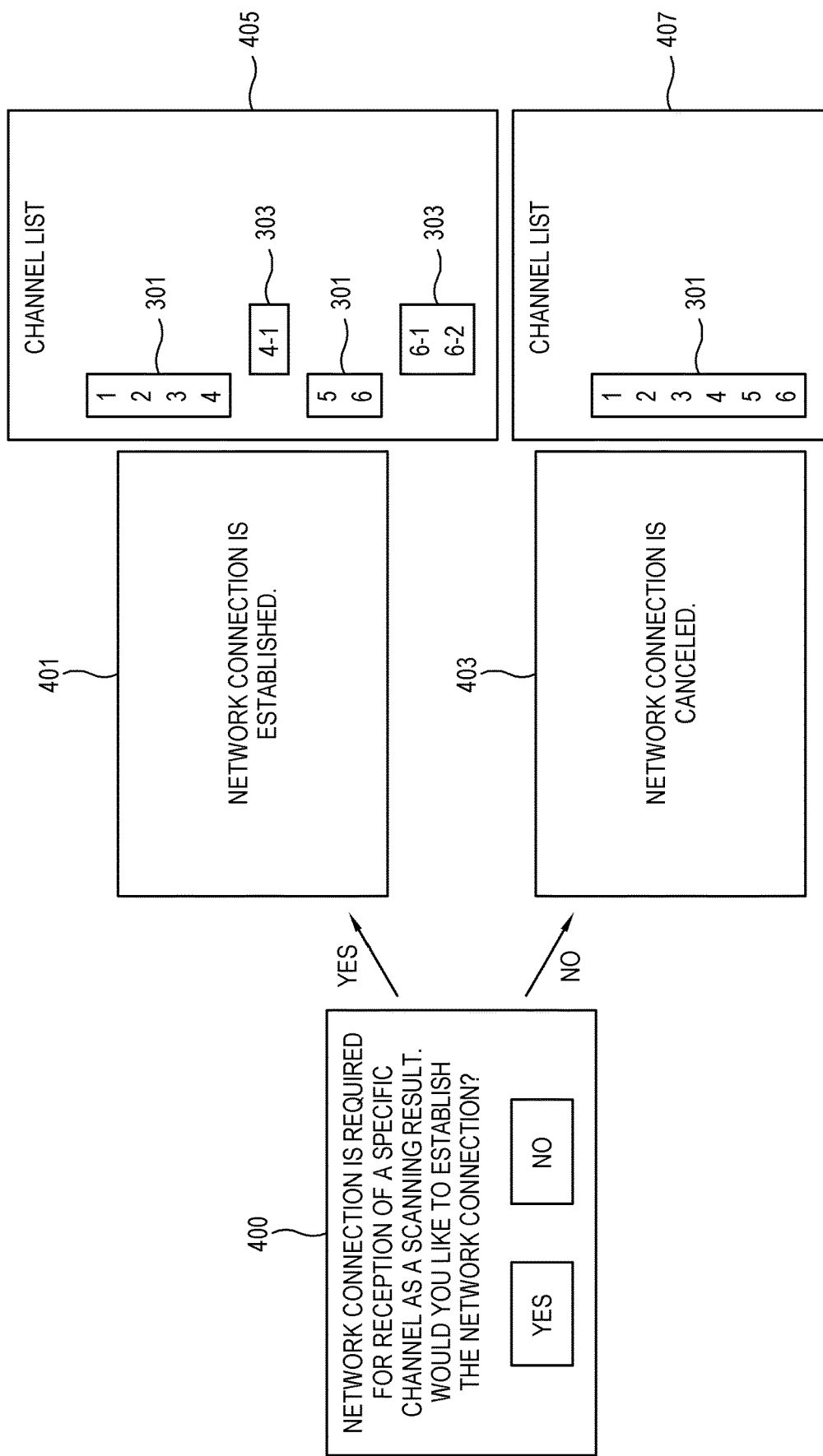
FIG. 6 illustrates an example of storing guide information and a channel list according to an exemplary embodiment.

If it is determined that there exists a channel of the second broadcast signal but the communicator 205 is not connected to the network 10, the controller 207 may provide guide information for receiving the channel 303 of the second broadcast signal. FIG. 6 illustrates an example of storing guide information 400 according to an exemplary embodiment. If it is determined as a result of the channel scan for the first broadcast signal that there exists the channel 303 of the second broadcast signal but the communicator 205 is not connected to the network, the controller 207 may control the display 203 to display the guide information 400 for informing a user that there is a need of connecting with the network to receive the second broadcast signal of the channel 303. The guide information 400 may include information for helping a user to connect the communicator 205 with the network 10, such as a method of connecting a network cable to a wired communicator 205, a method of setting a wireless network, etc. Further, the guide information 400 may be given in the form of a graphic user interface (GUI) including at least one menu item for receiving a user's input.

If a user sets up the network by selecting "YES" on the menu item given together with the guide information 400, the controller 207 may inform the user that a network connection has been established (401). If it is determined that the communicator 205 and the network 10 are connected, the controller 207 may control the storage 211 to store a channel list 405 including the channel 301 of the first broadcast signal and the channel 303 of the second broadcast signal. On the other hand, if a user chooses not to set up the network by selecting "NO" on the menu item of the guide information 400, the controller 207 may inform the user that the network connection is canceled (403). In this case, the controller 207 may control the storage 211 to store a channel list 407 including only the channel 301 of the first broadcast signal without the channel 303 of the second broadcast signal.

Alternatively, if it is determined as a result of the channel scan for the first broadcast signal that there is a channel of the second broadcast signal, the controller 207 may insert the channel of the second broadcast signal on the channel list in accordance with whether or not the second broadcast signal is available to be received. That is, if it is determined based on the first broadcast signal that there exists a channel of the second broadcast signal, the controller 207 may determine whether the communicator 205 is connected to the network 10. If the communicator 205 is connecting to the network 10, the controller 207 may determine whether the second broadcast signal corresponding to the channel is available to be received through the communicator 205. If the second broadcast signal of the corresponding channel is available, the controller 207 may insert the channel of the second broadcast signal on the channel list. On the other hand, if the second broadcast signal of the corresponding channel is not available, the controller 207 may not insert or may remove the channel of the second broadcast signal on the channel list.

If it is determined as a result of the channel scan for the first broadcast signal that there exists a channel of the second broadcast signal, but the second broadcast signal of the corresponding channel is not available to be received through the communicator 205, the controller 207 may provide the guide information for informing a user of this status. The guide information may be similar to the guide information 400 described with reference to FIG. 6.

Figure 7:
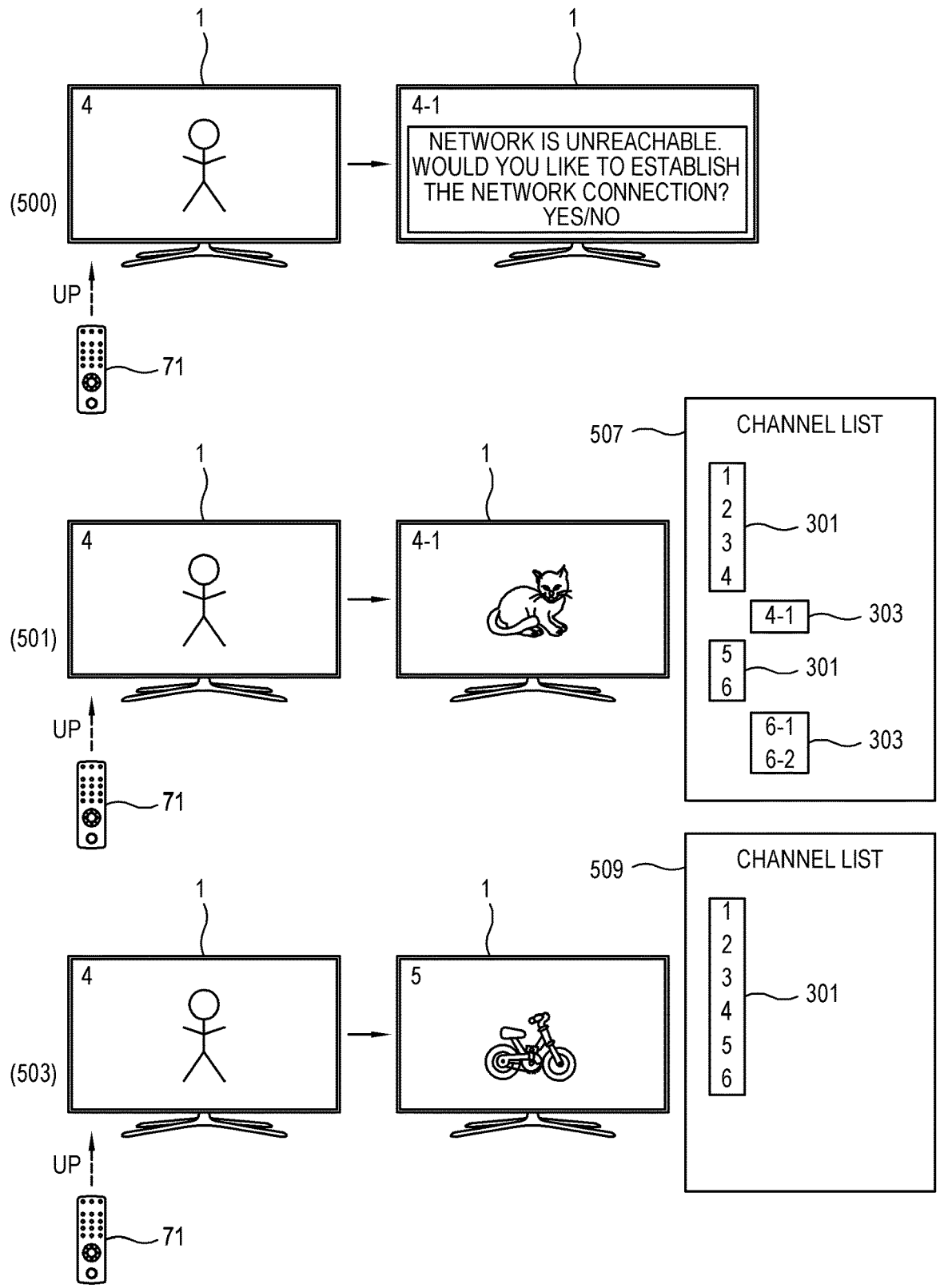
FIG. 7 illustrates an example of accessing a network channel included in the channel list and an example of storing the channel list according to an exemplary embodiment.

FIG. 7 illustrates an example of accessing a channel of the second broadcast signal, stored in the channel list, according to an exemplary embodiment. After the channel list is generated by the channel scan, a user may issue a sequential channel switching command to switch over between channels included in the channel list through an arrow key or the like of a remote controller 71. If the channel of the second broadcast signal is included in the channel list, it is possible to access the channel of the second broadcast signal through the sequential channel switching command. First, the numeral 501 of FIG. 7 shows that both the channels 301 of the first broadcast signal and the channels 303 of the second broadcast signal are included in a channel list 507. If a user switches the channel up while content of channel 4, i.e., the channel 301, of the first broadcast signal is being displayed, the controller 207 may control the communicator 205 to receive and provide content corresponding to channel 4-1, i.e., the channel 303, of the second broadcast signal. If the communicator 205 is not connected to the network 10, the controller 207 may provide guide information for informing a user of the network connection status, the network settings, etc. instead of or before displaying content of channel 4-1, i.e., the channel 303, of the second broadcast signal (500).

Figure 8:
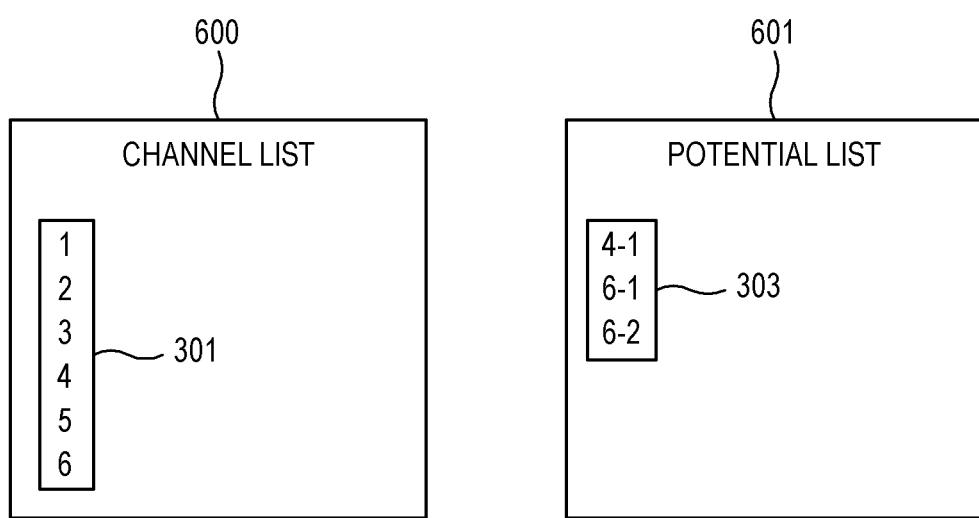
FIG. 8 illustrates a channel list and a potential list collected according to another exemplary embodiment.

In addition, a numeral 503 shows a channel list 509 including only the channel 301 of the first broadcast signal without the channel 303 of the second broadcast signal even though it is determined that there is the channel 303 of the second broadcast signal such as channel 4-1. If a user switches the channel up while content of channel 4, i.e., the channel 301, of the first broadcast signal is being displayed, the controller 207 may receive and provide content of channel 5, i.e., the channel 301, of the first broadcast signal. In this case, the controller 207 may provide guide information for informing the user of the presence of channel 4-1, i.e., the channel 303, of the second broadcast signal, the network connection status, etc. together with or separately from the display of the content of channel 5, i.e., the channel 301, of the first broadcast signal. Although it is determined based on the first broadcast signal that there is a channel of the second broadcast signal, if the channel list for the first broadcast signal does not include the channels of the second broadcast signal, the controller 207 may make a channel list (hereinafter, referred to as a "potential list") with the channels of the second broadcast signal. FIG. 8 illustrates a potential list generated according to another exemplary embodiment. The controller 207 may generate a channel list 600 with the available channels 301 of the first broadcast signal as a result of the channel scan for the first broadcast signal. As described above, the controller 207 may not insert the channels 303 of the second broadcast signal on the channel list 600 in case of network disconnection, no reception of the second broadcast signal, etc. even though the presence of the channels 303 of the second broadcast signal may have been determined as a result of the channel scan for the first broadcast signal. In this case, the controller 207 may generate a potential list 601 with the channels 303 of the second broadcast signal, which are pending to be included in the channel list 300. The controller 207 may control the storage 211 to store the potential list 601. The channel list 600 and the potential list 601 may be generated separately from each other, or may be generated as one channel list within which the channel 301 of the first broadcast signal and the channel 303 of the second broadcast signal are distinguishable (e.g., marked differently).

The controller 207 may allow channel switching only within the channel list 600 in response to a user's sequential channel switching command, but prevent the channel switching from the channel list 600 to the potential list 601. If there is a user's direct channel switching command, for example, if a user directly inputs the number of the channel 303 of the second broadcast signal included in the potential list 601, the controller 207 controls the communicator 205 to receive the second broadcast signal of the corresponding channel 303. If it is possible to receive the second broadcast signal of the corresponding channel 303 through the communicator 205, the controller 207 may provide the content of the corresponding channel 303. If the communicator 205 is not connected to the network 10 or if it is impossible to receive the second broadcast signal of the corresponding channel 303 even though the communicator 205 is connected to the network 10, the controller 207 may provide the guide information for informing a user of such a state.

Figure 9:
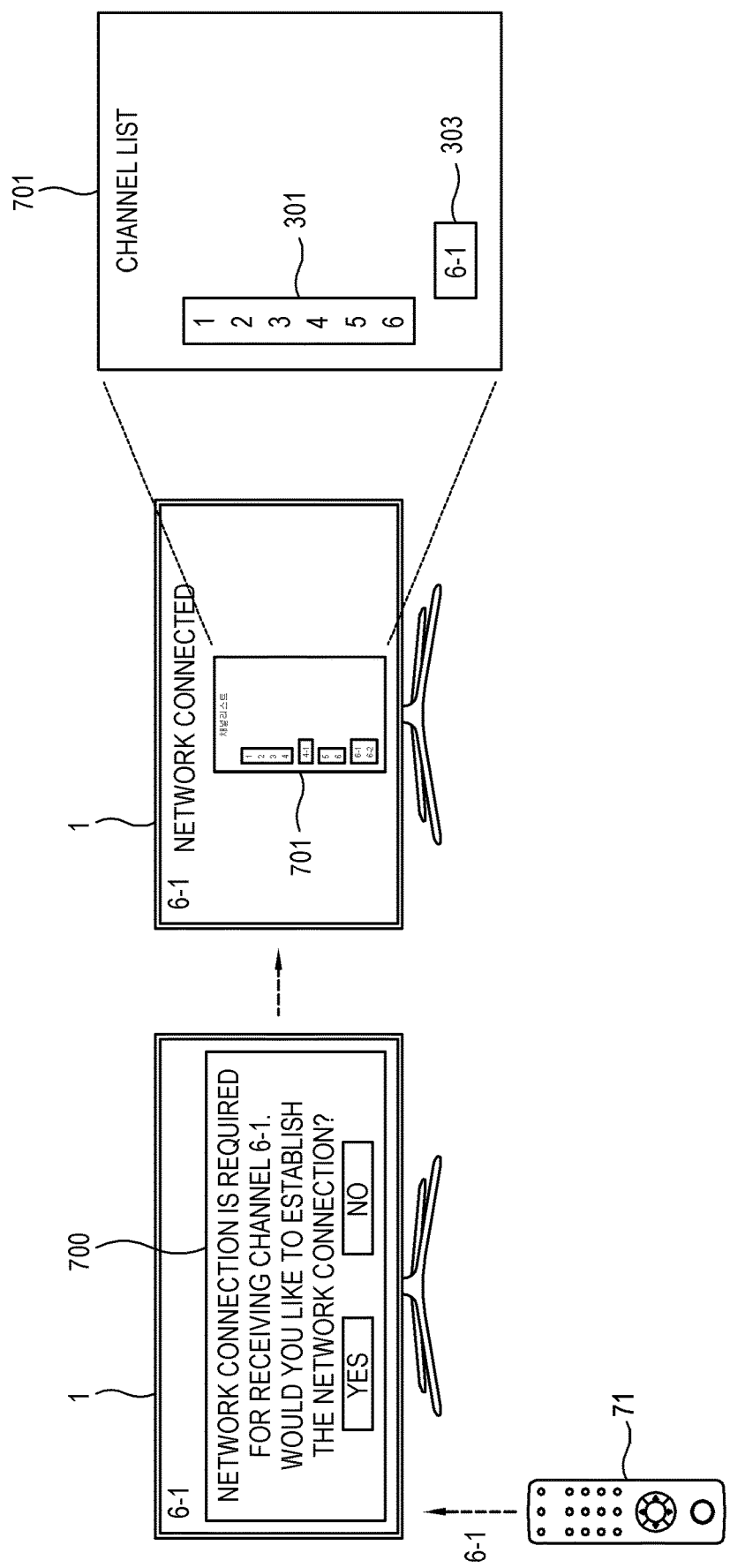
FIG. 9 illustrates an example of accessing a network channel included in the potential list and an example of storing the channel list according to another exemplary embodiment.

The controller 207 may insert the channel 303 of the second broadcast signal included in the potential list 601 on the channel list 600 in accordance with the status and condition of the electronic apparatus 1. For example, if the second broadcast signal of the channel 303 included in the potential list 601 changes from an unavailable state to available state, the controller 207 may insert the channel 303 of the potential list 601 on the channel list 600. FIG. 9 illustrates an example of inserting a channel of a potential list on a channel list. As shown in FIG. 9, if it is impossible to receive the second broadcast signal of the channel 303 since the communicator 205 is disconnected from the network 10 even though the channel 303 of the second broadcast signal included in the potential list 601 is selected by the direct channel switching command, the controller 207 may provide guide information 700 for guiding reception of the second broadcast signal corresponding to the channel 303. When the communicator 205 is connected to the network 10 as a user selects "YES" through the menu item given together with the guide information 700, the controller 207 may inform the user that the network connection for the electronic apparatus 1 is established and insert the channel 303 of the second broadcast signal, i.e., channel 6-1, directly input by the user on a channel list 701 for the channels 301 of the first broadcast signal. In this case, the controller 207 may control the communicator 205 to receive content of channel 6-1 and control the display 203 to display the content. The controller 207 may delete the channel 303, which is included in the channel list 600, from the potential list 601.

Alternatively, the controller 207 may insert the channels of the second broadcast signal on the potential list because of bad reception even though the communicator 205 may be connected to the network 101, and then try again to determine whether the second broadcast signal of the corresponding channel is available. If it is determined based on this attempt that the second broadcast signal of the corresponding channel is available, the controller 207 may insert the channel of the corresponding second broadcast signal in the channel list. In this case, the controller 207 may provide the guide information for informing a user that there exists a channel of the second broadcast signal to be transferred from the potential list to the channel list.

The controller 207 may edit the channel list and/or the potential list with regard to the channel of the second broadcast signal in response to a user's input. The edition of the channel list and/or the potential list with regard to the channel of the second broadcast signal may include deleting the channel of the second broadcast signal from the channel list or the potential list, newly adding the channel of the second broadcast signal in the channel list, transferring the channel of the second broadcast signal from the channel list to the potential list, transferring the channel of the second broadcast signal from the potential list to the channel list, and so forth. In this case, the controller 207 may control the display 203 to display a GUI including at least one menu item for receiving a user's input for editing the channel list and/or the potential list. Through the GUI, the controller 207 may display information about reception of the second broadcast signal corresponding to a channel to be edited, for example, information about a network connection status, information about whether or not the second broadcast signal is available, etc.

The controller 207 may display an electronic program guide (EPG) to show information about a channel of the second broadcast signal, presence of which is determined based on the first broadcast signal. FIG. 10 illustrates an example of the EPG generated according to an exemplary embodiment. The controller 207 provides an EPG 800 about the channels 301 and 303 of the first and second broadcast signals included in the channel list (see 300 in FIG. 5). If a user selects a desired program through the EPG 800, the controller 207 may perform control to receive a broadcast signal of the channels 301 and 303 corresponding to the selected program and provide content of the selected program. The EPG 800 may include at least one piece of information about whether each of the channels 301 and 303 corresponds to the channel 301 of the first broadcast signal or the channel 303 of the second broadcast signal (indicated by BROADCAST or BROADBAND in FIG. 10), information about whether each of the channels 301 and 303 is available or not (indicated by "○" or "×" in FIG. 10), an item 801 informing whether the communicator 205 is connected to the network, and information about each content of the channels 301 and 303. In addition, the EPG 800 may include an identifying item for informing whether each of the channels 301 and 303 is included in the channel list (see 600 in FIG. 8) or the potential list (see 601 in FIG. 8). Therefore, a user can more intuitively and easily recognize the states of the electronic apparatus 1 about the reception of the channel 303 for the second broadcast signal, based on the reception ("○" or "×") or identifying item 801 of the channels 301 and 303 provided through the EPG 800. Further, a user can immediately take action to receive the second broadcast signal through the channel 303, by connecting the communicator 205 with the network 10 or like action in accordance with the states of the electronic apparatus 1 based on the information given by the EPG 800, and it is therefore more convenient for the user.

Figure 11:
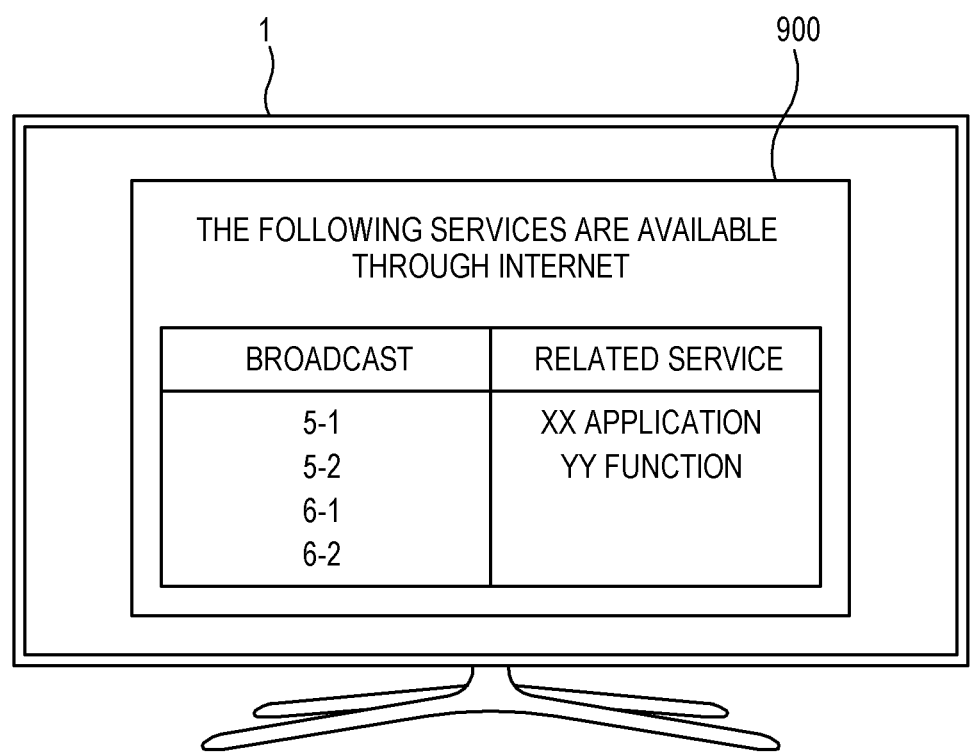
FIG. 11 illustrates an example of guide information provided to a user according to an exemplary embodiment.

FIG. 11 illustrates another example of guide information provided to a user according to an exemplary embodiment. The controller 207 may provide guide information 900 about a related service usable in relation to the channel 303 of the second broadcast signal included in the channel list 300. The guide information 900 may include a guide message for informing a user that the related service is available for use with the network connection. The related service may include an application available in relation to each channel 303 of the second broadcast signal, information about functions or the like provided in each channel 303. The controller 207 may provide the guide information 900 when the electronic apparatus 1 is initialized, when a user selects the channel 303 or appended service of the second broadcast signal, when the network-connection state of the communicator 205 is changed, etc.

Figure 12:
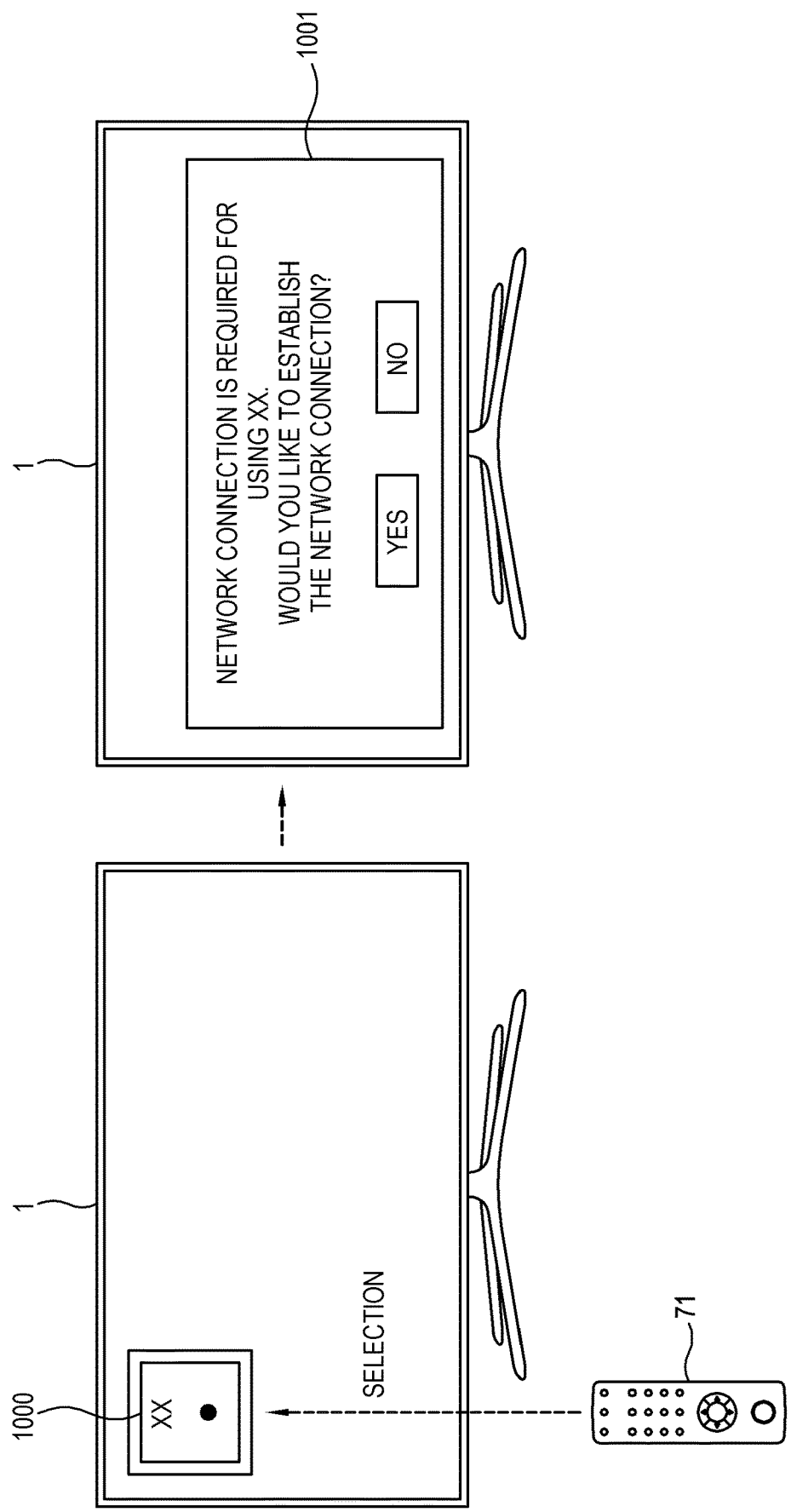
FIG. 12 illustrates an example of guide information provided to a user when the user wants to execute an application requiring an Internet access according to an exemplary embodiment.

FIG. 12 illustrates another example of guide information provided to a user according to an exemplary embodiment. The controller 207 may control the display 203 to display a menu item 1000 showing an application available in relation to the channel 303 of the second broadcast signal. If a user selects the menu item 1000 corresponding to the application available in relation to the channel 303 of the second broadcast signal through a remote controller 71 or the like, the controller 207 may provide guide information 1001 for informing a user that network connection is required to use the application. The controller 207 may execute the application when a user selects "YES" on the menu item given together with the guide information 1001 so as to connect with the network.

Figure 13:
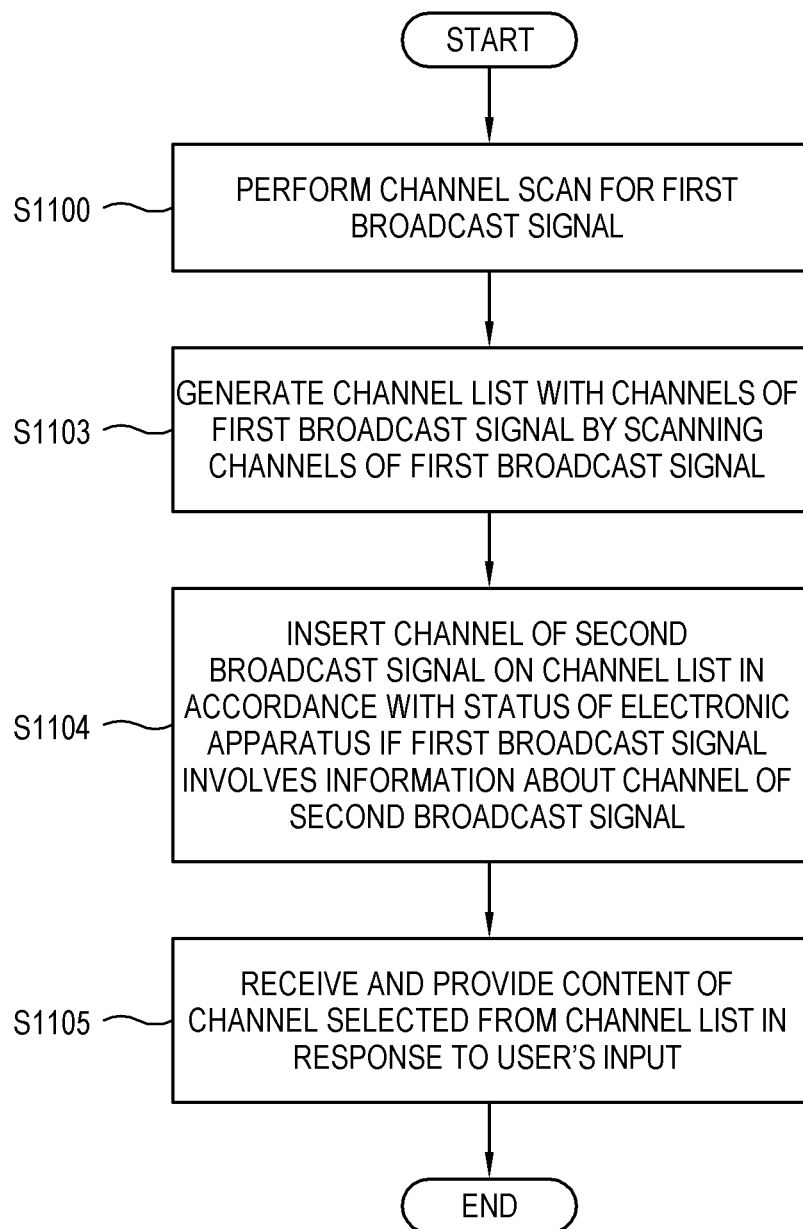
FIG. 13 is a control flowchart of an electronic apparatus according to an exemplary embodiment.

FIG. 13 is a control flowchart of an electronic apparatus according to an exemplary embodiment. In this exemplary embodiment, the same or similar features of the electronic apparatus 1 described with reference to FIGS. 1 to 12 may be applied to a method of controlling the electronic apparatus 1 shown in FIG. 13. At operation S1100, the receiver 200 may perform the channel scan for the first broadcast signal. At operation S1103, the controller 207 may generate the channel list with the available channels of the first broadcast signal as a result of the channel scan for the first broadcast signal. At operation S1104, if information about the channel of the second broadcast signal is embedded in the first broadcast signal, the controller 207 may insert the channel of the second broadcast signal on the channel list in accordance with status of the electronic apparatus 1. At operation S1105, the controller 207 may receive and provide content of a channel selected from the channel list in response to a user's input.

Figure 14:
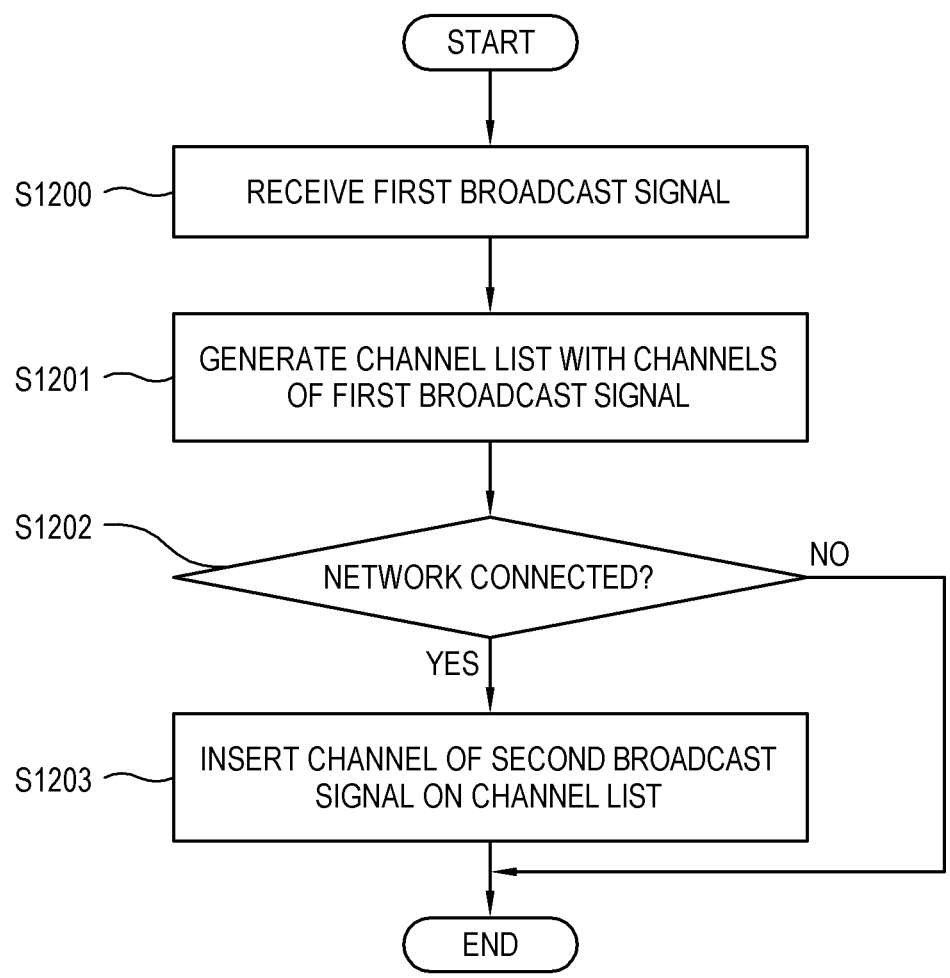
FIG. 14 is a control flowchart of an electronic apparatus according to an exemplary embodiment.

FIG. 14 is a control flowchart of an electronic apparatus according to an exemplary embodiment. In this exemplary embodiment, the same or similar features of the electronic apparatus 1 described with reference to FIGS. 1 to 13 may be applied to a method of controlling the electronic apparatus 1 shown in FIG. 14. At operation S1200, the receiver 200 may receive the first broadcast signal. At operation S1201, the controller 207 may generate the channel list 300 with the available channels of the first broadcast signal. At operation S1202, the controller 207 may determine whether the communicator 205 is connected to the network 10. If it is determined that the communicator 205 is connected to the network 10, at operation S1203 the controller 207 may insert the channel 303 of the second broadcast signal on the channel list 300 based on the information about the channel of the second broadcast signal embedded in the first broadcast signal.

Figure 15:
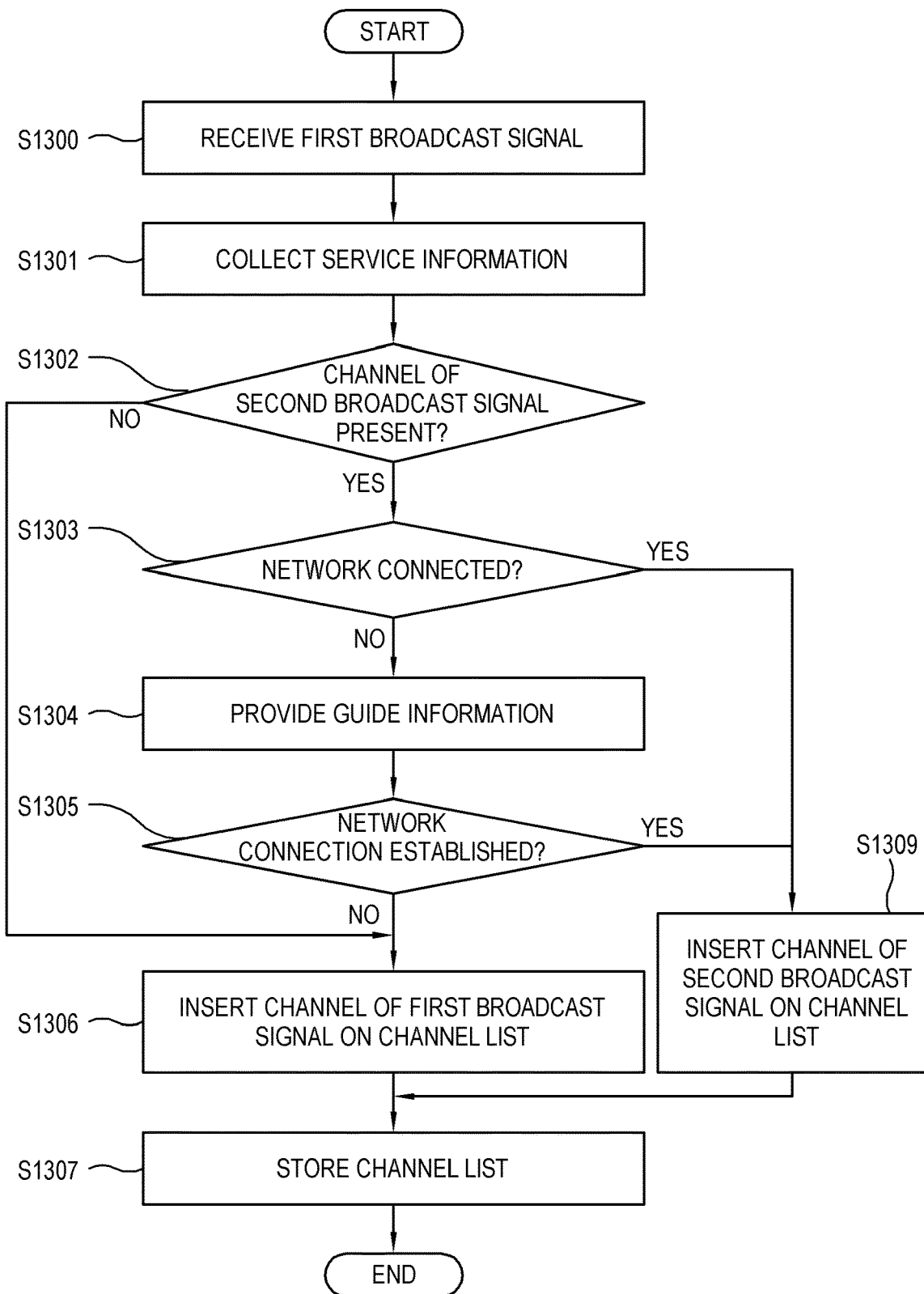
FIG. 15 is a control flowchart of an electronic apparatus according to an exemplary embodiment.

FIG. 15 shows another example of a control flowchart of an electronic apparatus according to an exemplary embodiment. In this exemplary embodiment, the same or similar features of the electronic apparatus 1 described with reference to FIGS. 1 to 14 may be applied to a method of controlling the electronic apparatus 1 shown in FIG. 15. At operation S1300, the receiver 200 may receive the first broadcast signal. At operation S1301, the controller 207 may collect service information about channels of the first broadcast signal and/or the second broadcast signal from the first broadcast signal. At operation S1302, the controller 207 may determine whether there exists a channel of the second broadcast signal based on the collected service information. If it is determined that there are no channels of the second broadcast signal, at operation S1306 the controller 207 may insert the channel of the first broadcast signal on the channel list based on the collected service information.

If it is determined in the operation S1302 that there is a channel of the second broadcast signal, at operation S1303 the controller 207 may determine whether the communicator 205 is connected to the network 10. If it is determined that the communicator 205 is connected to the network 10, at operation S1309 the controller 207 may insert the channel of the second broadcast signal on the channel list based on the collected service information.

If it is determined in the operation S1303 that the communicator 205 is disconnected from the network, at operation S1304 the controller 207 may provide the guide information for receiving the channel of the second broadcast signal. Further, at operation S1305 the controller 207 may determine whether the network connection is established. If it is determined in the operation S1305 that the network connection is established, at operation S1309 the controller 207 may insert the channel of the second broadcast signal on the channel list based on the collected service information.

If it is determined in the operation S1305 that the network connection is not established, at operation S1306 the controller 207 may insert the channel of the first broadcast signal on the channel list based on the collected service information. At operation S1307, the controller 207 may control the storage 211 to store the channel list including the channels of the first broadcast signal and/or the second broadcast signal.

Figure 16:
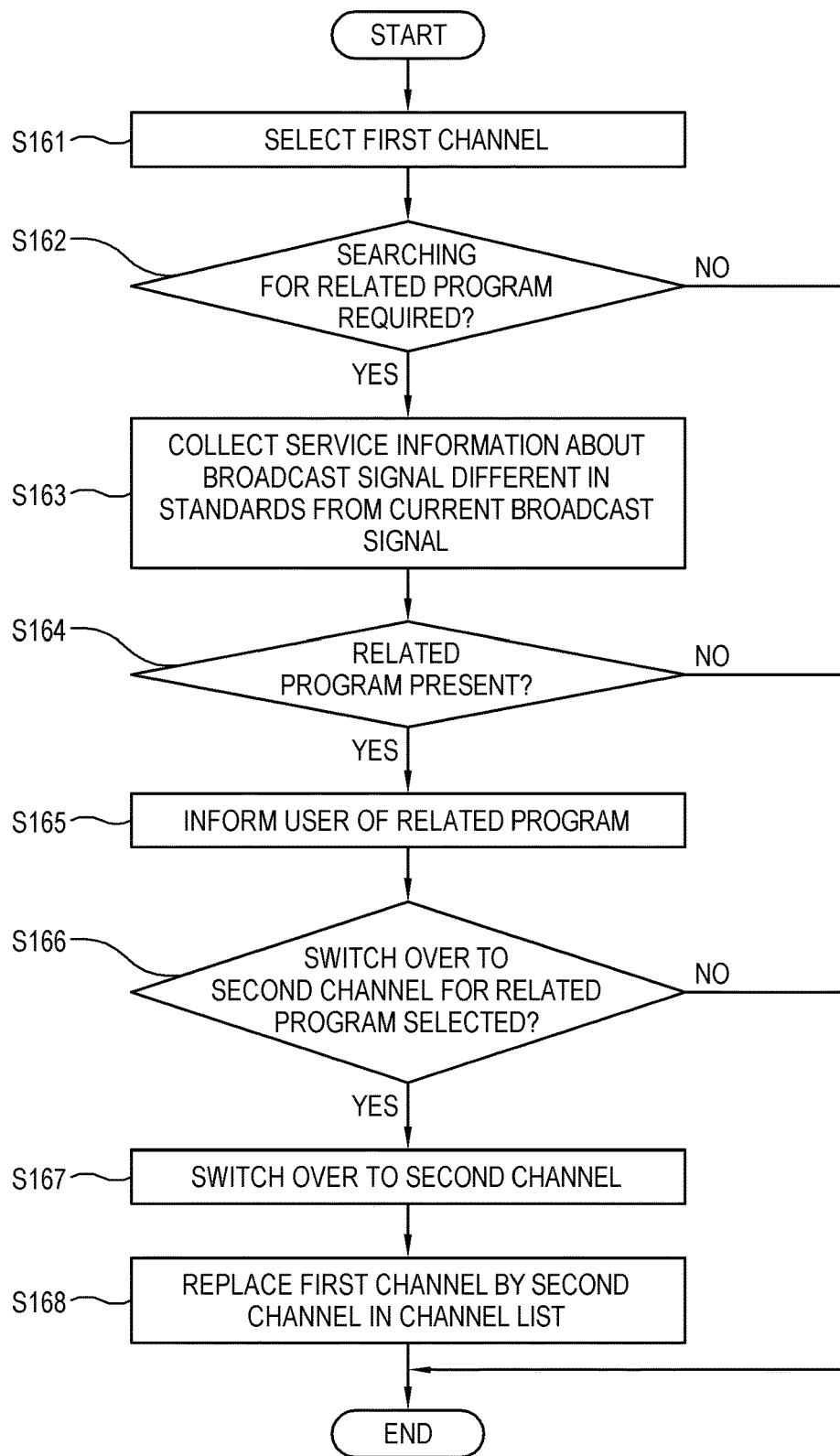
FIG. 16 is a flowchart of showing a method of controlling an electronic apparatus according to another exemplary embodiment.

FIG. 16 is a flowchart of showing a method of controlling an electronic apparatus according to another exemplary embodiment, and FIG. 17 is a table showing information about channels available in the electronic apparatus according to another exemplary embodiment. In a method of controlling the electronic apparatus 1 shown in FIGS. 16 and 17, duplicative descriptions about the same or similar features to the electronic apparatus 1 described with reference to FIGS. 1 to 15 will be omitted. At operation S161, the electronic apparatus 1 may select a first channel. The selection of the first channel may be achieved in response to a user's input, or when the electronic apparatus 1 is turned on. At operation S162, the electronic apparatus 1 may determine whether there is a need of searching for a program related to the selected first channel. According to an exemplary embodiment, the related program may be a program (e.g., TV program) recommended to a user as a program to be selectable instead of the program of the first channel. Specifically, the related program may have the same content as but a different format from the program of the first channel. For example, if the program of the first channel has content of a movie "Ben-Hur" having a resolution of high definition (HD), the related program may have content of the movie "Ben-Hur" having a resolution of ultrahigh definition (UHD). However, this is merely an example, and there are no limits to the related program according to this exemplary embodiment. Besides the resolution, the format of the program may, for example, include different video quality or audio quality.

If the broadcast signal of the first channel complies with specific broadcasting standards, the electronic apparatus 1 may determine whether there is a need of searching a program related to the selected first channel. For example, referring to a table 170 of FIG. 17, the electronic apparatus 1 may receive a broadcast signal of channel 9-1 complying with the standards of ATSC 1.0, and a broadcast signal of channel 9-1 complying with the standards of ATSC 3.0. Alternatively, the electronic apparatus 1 may receive a broadcast signal of channel 11-1 complying with the standards of ATSC 1.0, and a broadcast signal of channel 11-10 complying with the standards of ATSC 3.0. Channel 9-1' or channel 11-1 complying with the standards of ATSC 1.0 provides a program having a resolution of HD, and channel 9-1 or channel 11-10 complying with the standards of ATSC 3.0 provides a program having a resolution of UHD. For example, the electronic apparatus 1 may determine whether the received broadcast signal complies with the standards of ATSC 1.0 or ATSC 3.0 by referring to L2 protocol information provided in a data link layer of the broadcast signal. At operation S162, if the first channel is a channel (e.g., channel 9-1) that complies with the standards of ATSC 1.0, the electronic apparatus 1 may determine that there is a need for searching for a program related to the first channel. That is, the electronic apparatus 1 may search for another channel in order to check whether there is a channel of a resolution (e.g., UHD) higher than the resolution (e.g., HD) of the currently selected first channel.

If it is determined in the operation S162 that there is a need for searching for a related program, at operation S163 the electronic apparatus 1 may collect service information about the broadcast signal of the current first channel and a broadcast signal complying with different standards from the first channel. For example, the electronic apparatus 1 may collect service information about each of the broadcast signal of the current channel 9-1 complying with the standards of ATSC 1.0 and the broadcast signal complying with the standards of ATSC 3.0. The electronic apparatus 1 may include the receiver 200 for receiving the broadcast signals complying with the standards of ATSC 1.0 and ATSC 3.0. To collect the service information about the broadcast signal complying with the standards of ATSC 1.0, the electronic apparatus 1 may refer to a program association table (PAT), a program map table (PMT), an event information table (EIT), etc. received from the broadcast signal according to frequency bands. On the other hand, to collect the service information about the broadcast signal complying with the standards of ATSC 3.0, the electronic apparatus 1 may refer to the foregoing service list table (SLT) described with reference to FIG. 3.

At operation S164, the electronic apparatus 1 may determine whether there is a program related to the current first channel based on the collected service information. That is, the electronic apparatus 1 may determine whether there is a program related to the first channel in a channel (hereinafter, referred to as a "second channel") provided through the broadcast signal complying with the standards of ATSC 3.0 different from the standards of the current first channel. The electronic apparatus 1 may search for a program related to the second channel with respect to the same channel as the first channel or a channel having the same broadcasting station (or the same channel name, ID or the like). The electronic apparatus 1 may compare two programs provided through the first channel and the second channel with respect to information. For example, the electronic apparatus 1 may determine whether two programs are identical or similar with respect to a start time, an end time, or a length (i.e., running time). Alternatively, the electronic apparatus 1 may determine whether two programs are identical or similar based on texts or the like included in the programs or describing the programs.

By the way, the electronic apparatus 1 may compare two programs with respect to the information, thereby determining quality of the programs. Specifically, the electronic apparatus 1 may compare two programs with respect to a resolution. For example, the electronic apparatus 1 may determine that high efficiency video coding (HEVC)/H265 or scalable HEVC has a higher resolution than MPEG-2. Alternatively, the electronic apparatus 1 may compare two programs with respect to audio quality. For example, the electronic apparatus 1 may determine that AC-4 or MPEG-H has higher quality than AC-3 or other audio codec. The electronic apparatus 1 may determine video or audio quality of the program based on a codec. Alternatively, the electronic apparatus 1 may determine the resolutions of the programs based on resolution information involved in the service information. For example, the electronic apparatus 1 may determine that a resolution of 3840×2160 is higher than a resolution of 1920×1080.

As such, the electronic apparatus 1 may determine whether there is a second channel having the same or similar program to the first channel and having quality, e.g., resolution or the like higher than that of the first channel, based on the service information. If it is determined in the operation S164 that there exists a second channel that provides a related program, at operation S165 the electronic apparatus 1 may inform a user of the related program.

Figure 18:
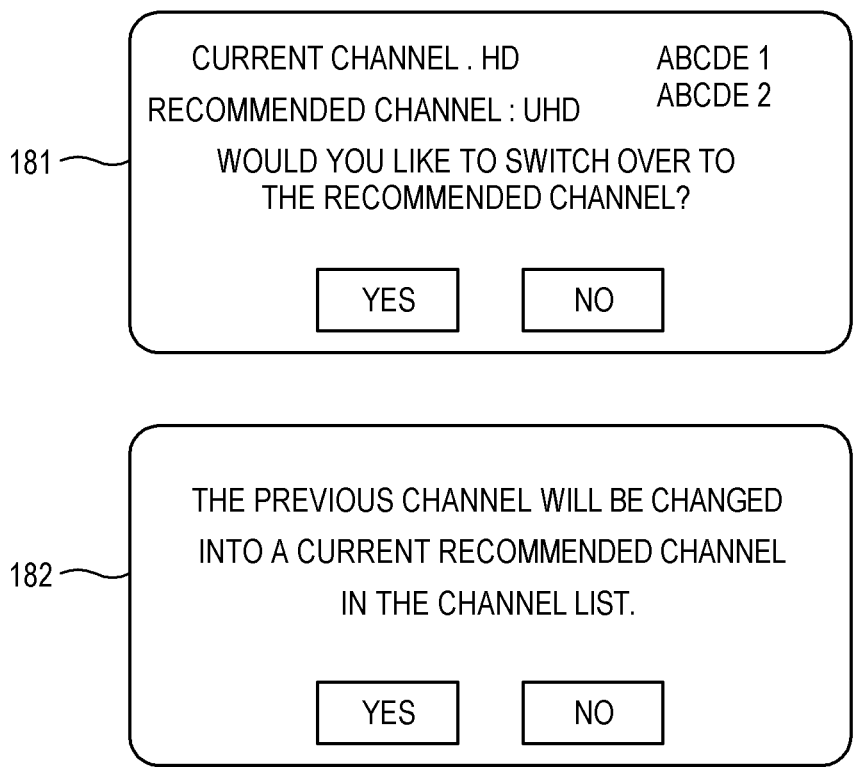
FIG. 18 illustrates an example of messages given by an electronic apparatus according to an exemplary embodiment.

FIG. 18 illustrates an example of messages given by the electronic apparatus 1 according to an exemplary embodiment. For example, if it is determined that there is a program related to the first channel, the electronic apparatus 1 may display a guide message 181 involving information about the related program. The guide message 181 may show that a program "ABCDE 1" of the current first channel has a resolution of HD, but a program "ABCDE 2" of the recommended second channel has a resolution of UHD. The guide message shown in FIG. 18 is merely an example, and the electronic apparatus 1 according to an exemplary embodiment may provide a variety of information to a user. A user may select the second channel according to her taste by referring to the guide message 181. In response to a user's input on a selection menu ("YES"/"No") of the guide message 181, the electronic apparatus 1 may switch over to the second channel ("YES" in the operation S166 and the operation S167), or keep the first channel ("NO" in the operation S166). According to an exemplary embodiment, the electronic apparatus 1 may automatically search for a program related to the current channel and provide a search result, and is thus more convenient for a user to switch over to a channel of the program.

Alternatively, at operation S168, the electronic apparatus 1 according to an exemplary embodiment may replace the first channel included in the channel list described with reference to FIG. 5 and the like by the second channel of providing the related program. For example, the electronic apparatus 1 may insert the second channel instead of the first channel, which is included in the channel list, on the channel list in order to switch over to the second channel that provides the related program in response to a user's input. In this case, the electronic apparatus 1 may display a guide message 182 of inquiring about whether to insert the second channel on the channel list, and insert the second channel on the channel list in response to a user's input on a selection menu ("YES"/"No") of the guide message 182. Then, the electronic apparatus 1 may receive and display the broadcast signal through the second channel instead of the first channel even when the first channel is selected by the sequential channel switching command. Alternatively, if the first channel is kept without switching over to the second channel in response to a user's input, the electronic apparatus 1 may insert the second channel on the potential list. Then, the electronic apparatus 1, refer to the potential list, and present to a user the information about the second channel of providing the related program when the first channel is selected.

As described above, according to various exemplary embodiments, it is possible to put a network channel on a channel list in accordance with various states of an electronic apparatus, and it is therefore more convenient for a user.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An electronic apparatus comprising:
a receiver configured to receive a broadcast signal;
a communicator configured to communicate through a network;
an input interface configured to receive a user input; and
a controller configured to:
perform a channel scan for the broadcast signal,
generate a channel list comprising a first channel of the broadcast signal based on the channel scan,
obtain information regarding a second channel from the broadcast signal, the second channel being available through the network,
generate a potential channel list comprising the second channel based on the obtained information,
provide guide information to prompt a user to establish a connection to the network based on a network connection status of the communicator indicating that the electronic apparatus is not connected to the network, and
receive and provide content corresponding to one of the first channel and the second channel selected from the channel list and the potential channel list,
wherein the content corresponding to the second channel is received through the communicator, which is different from the receiver through which the information regarding the second channel is obtained from the broadcast signal,
wherein when the network connection status of the communicator indicates that the electronic apparatus is not connected to the network, the controller is further configured to prevent a channel switching to the second channel in the potential channel list in response to a first user input of channel up or down and to allow the channel switching to the second channel in the potential channel list in response to a second user input of inputting a channel number of the second channel, and wherein when the network connection status of the communicator indicates that the electronic apparatus is connected to the network, the controller is further configured to add the second channel in the channel list and allow the channel switching to the second channel in the channel list in response to a third user input of channel up or down and to allow the channel switching to the second channel in the channel list in response to a fourth user input of inputting the channel number of the second channel.

2. The electronic apparatus according to claim 1, wherein the controller is further configured to add the second channel in the channel list in response to determining that the second channel exists and a second broadcast signal of the second channel is available to be received through the communicator.

3. The electronic apparatus according to claim 1, wherein the controller is further configured to store the potential channel list, in which the second channel is selectable by a direct input of the second channel, in response to at least one of the communicator being disconnected from the network and a second broadcast signal of the second channel being unavailable.

4. The electronic apparatus according to claim 1, wherein the controller is further configured to provide the guide information for receiving the second channel.

5. The electronic apparatus according to claim 4, wherein the controller is further configured to provide the guide information to prompt the user to establish the connection to the network, in response to the second channel being selected while the communicator is disconnected from the network.

6. The electronic apparatus according to claim 1, wherein the controller is further configured to provide electronic program guide (EPG) information comprising the guide information about reception of the second channel.

7. The electronic apparatus according to claim 1, wherein the controller is further configured to provide the guide information for use of an application about the second channel.

8. A method of controlling an electronic apparatus, the method comprising:
performing a channel scan for a broadcast signal received through a receiver of the electronic apparatus;
generating a channel list comprising a first channel of the broadcast signal based on the channel scan;
obtaining information regarding a second channel from the broadcast signal, the second channel being available through a network;
generating a potential channel list comprising the second channel based on the obtained information;
providing guide information to prompt a user to establish a connection to the network based on a network connection status of a communicator of the electronic apparatus indicating that the electronic apparatus is not connected to the network;
receiving and providing content corresponding to one of the first channel and the second channel selected from the channel list and the potential channel list, wherein the content corresponding to the second channel is received through the communicator, which is different from the receiver through which the information regarding the second channel is obtained from the broadcast signal;

when the network connection status of the communicator indicates that the electronic apparatus is not connected to the network, preventing a channel switching to the second channel in the potential channel list in response to a first user input of channel up or down and allowing the channel switching to the second channel in the potential channel list in response to a second user input of inputting a channel number of the second channel; and wherein the network connection status of the communicator indicates that the electronic apparatus is connected to the network, adding the second channel in the channel list and allowing the channel switching to the second channel in the channel list in response to a third user input of channel up or down, and allowing the channel switching to the second channel in the channel list in response to a fourth user input of inputting the channel number of the second channel.

9. The method according to claim 8, wherein the determining whether to add the second channel in the channel list comprises:
determining whether a second broadcast signal of the second channel is available to be received through the network; and
determining to add the second channel on the channel list in response to the second broadcast signal of the second channel being available to be received through the network.

10. The method according to claim 8, wherein the determining whether to add the second channel in the channel list comprises:
storing the potential channel list, in which the second channel is selectable by a direct input of the second channel, in response to at least one of the electronic apparatus being disconnected from the network and a second broadcast signal of the second channel being unavailable.

11. The method according to claim 8, further comprising providing the guide information for receiving the second channel.

12. The method according to claim 11, wherein the providing the guide information comprises:
determining whether the electronic apparatus is connected to the network; and
providing the guide information in response to the second channel being selected while the electronic apparatus is disconnected from the network.

13. The method according to claim 8, further comprising providing electronic program guide (EPG) information comprising the guide information about reception of the second channel.

14. The method according to claim 8, further comprising:
providing the guide information for use of an application about the second channel.

15. A non-transitory computer-readable storage medium storing instructions which, when executed by a processor, cause the processor to perform operations of controlling an electronic apparatus comprising:
performing a channel scan for a broadcast signal received through a receiver of the electronic apparatus;
generating a channel list that includes a first channel of the broadcast signal based on the channel scan;
obtaining information regarding a second channel from the broadcast signal the second channel being available through a network,
generating a potential channel list comprising the second channel based on the obtained information;

providing guide information to prompt a user to establish a connection to the network based on a network connection status of a communicator of the electronic apparatus indicating that the electronic apparatus is not connected to the network;

receiving and providing content corresponding to one of the first channel and the second channel selected from the channel list and the potential channel list, wherein the content corresponding to the second channel is received through the communicator, which is different from the receiver through which the information regarding the second channel is obtained from the broadcast signal;

when the network connection status of the communicator indicates that the electronic apparatus is not connected to the network, preventing a channel switching to the second channel in the potential channel list in response to a first user input of channel up or down input and allowing the channel switching to the second channel in the potential channel list in response to a second user input of inputting a channel number of the second channel; and when the network connection status of the communicator indicates that the electronic apparatus is connected to the network, adding the second channel in the channel list and allowing the channel switching to the second channel in the channel list in response to a third user input of channel up or down, and allowing the channel switching to the second channel in the channel list in response to a fourth user input of inputting the channel number of the second channel.

16. The non-transitory computer-readable storage medium of claim 15, wherein the first channel and the second channel are marked differently in the channel list according to a type of the broadcast signal.

17. The non-transitory computer-readable storage medium of claim 15, wherein channel information comprising a service list table is embedded in the broadcast signal.

18. The non-transitory computer-readable storage medium of claim 15, wherein the network is at least one of a local area network (LAN) and an internet.

19. The electronic apparatus according to claim 1, wherein the receiver is a first I/O interface, and the communicator is a second I/O interface different from the first I/O interface.

20. The electronic apparatus according to claim 1, wherein the controller is further configured to obtain the information regarding the second channel from the broadcast signal including the first channel after the receiver receives the broadcast signal, the second channel corresponding to the first channel.

21. The electronic apparatus according to claim 1, wherein the controller is further configured to omit adding the second channel in the channel list based on a fifth user input to not establish the connection to the network based on the guide information.

22. The method according to claim 8, further comprising:
omitting to add the second channel in the channel list based on a fifth user input to not establish the connection to the network based on the guide information.

23. The non-transitory computer-readable storage medium of claim 15, further comprising:
omitting to add the second channel in the channel list based on a fifth user input to not establish the connection to the network based on the guide information.

24. The electronic apparatus according to claim 1, wherein, based on a sixth a user input in response to the guide information, the controller is further configured to add the second channel in the channel list or omit the second channel from the channel list such that the controller adds the second channel in the channel list in response to the sixth user input requesting to establish the connection to the network and omits the second channel from the channel list in response to the sixth user input requesting to not establish the connection to the network.

* * * * *